United States Patent
Kinoshita

(10) Patent No.: US 10,005,365 B2
(45) Date of Patent: Jun. 26, 2018

(54) VEHICLE POWER SOURCE

(71) Applicant: SUBARU CORPORATION, Tokyo (JP)

(72) Inventor: Takahiro Kinoshita, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days. days.

(21) Appl. No.: 15/066,823

(22) Filed: Mar. 10, 2016

(65) Prior Publication Data

US 2016/0288651 A1 Oct. 6, 2016

(30) Foreign Application Priority Data

Mar. 31, 2015 (JP) .................. 2015-073431

(51) Int. Cl.
  *B60L 11/12* (2006.01)
  *F02N 11/08* (2006.01)
  (Continued)

(52) U.S. Cl.
  CPC .......... *B60L 11/12* (2013.01); *F02N 11/0866* (2013.01); *F02N 11/006* (2013.01);
  (Continued)

(58) Field of Classification Search
  CPC .... B60L 11/12; F02N 11/0866; F02N 11/006; F02N 11/04; F02N 11/0814;
  (Continued)

(56) References Cited

U.S. PATENT DOCUMENTS

| | | |
|---|---|---|
| 6,552,443 B1 | 4/2003 | Johnke et al. |
| 2005/0001431 A1 | 1/2005 | Sauer et al. |

(Continued)

FOREIGN PATENT DOCUMENTS

| | | |
|---|---|---|
| CN | 103326080 A | 9/2013 |
| DE | 19916452 A1 | 10/2000 |

(Continued)

OTHER PUBLICATIONS

Office Action issued in corresponding Chinese Patent Application No. 201610177720.4, dated Feb. 14, 2017.

(Continued)

*Primary Examiner* — Aaron L Troost
(74) *Attorney, Agent, or Firm* — McDermott Will & Emery LLP

(57) ABSTRACT

A vehicle power source includes a first switch, a second switch, a connection point, and a failure determiner. The first switch is switched between conductive/cut-off states of a generator and a first power storage. The second switch is switched between conductive/cut-off states of the generator and a second power storage. The connection point couples a first conduction path, a second conduction path, and a third conduction path to one another, in which the first conduction path is coupled to a positive electrode terminal of the first power storage. The failure determiner executes failure determination processing that involves determining a failure in one or both of the first switch and the second switch, based on control signals of the first switch and the second switch, and a current and a potential of the first conduction path.

18 Claims, 20 Drawing Sheets

(51) Int. Cl.
*F02N 11/00* (2006.01)
*F02N 11/04* (2006.01)

(52) U.S. Cl.
CPC .............. *F02N 11/04* (2013.01); *F02N 11/087* (2013.01); *F02N 11/0814* (2013.01); *F02N 2200/061* (2013.01)

(58) Field of Classification Search
CPC .............. F02N 11/087; F02N 2200/061; Y02T 10/6286; Y02T 10/7077
See application file for complete search history.

(56) References Cited

U.S. PATENT DOCUMENTS

| | | | |
|---|---|---|---|
| 2009/0212975 A1* | 8/2009 | Ausman | G01R 31/3277 340/945 |
| 2011/0320109 A1* | 12/2011 | Polimeno | B60L 3/0092 701/113 |
| 2013/0249219 A1 | 9/2013 | Kim et al. | |
| 2013/0320986 A1* | 12/2013 | Shiraishi | G01R 31/327 324/415 |
| 2015/0217641 A1* | 8/2015 | Slosarczyk | H02J 7/1423 701/22 |
| 2015/0239411 A1* | 8/2015 | Nakajima | B60R 16/033 307/10.6 |

FOREIGN PATENT DOCUMENTS

| | | |
|---|---|---|
| DE | 10329914 A1 | 2/2005 |
| JP | 2014-036557 A | 2/2014 |
| JP | 2015-033859 A | 2/2015 |
| JP | 2015-100240 A | 5/2015 |
| JP | 2015-109741 A | 6/2015 |

OTHER PUBLICATIONS

Office Action issued in corresponding German Patent Application No. 102016105430, dated Mar. 23, 2018.

* cited by examiner

[NORMAL]

| | | ON/OFF SWITCH:SW2 | |
|---|---|---|---|
| | | ON SIGNAL | OFF SIGNAL |
| ON/OFF SWITCH:SW1 | ON SIGNAL | [FIRST DETERMINATION PATTERN]<br>DETECTED VOLTAGE :HIGH<br>DETECTED CURRENT :DISCHARGE | [THIRD DETERMINATION PATTERN]<br>DETECTED VOLTAGE :HIGH<br>DETECTED CURRENT :WEAK DISCHARGE |
| | OFF SIGNAL | [SECOND DETERMINATION PATTERN]<br>DETECTED VOLTAGE :HIGH<br>DETECTED CURRENT :ZERO | [FOURTH DETERMINATION PATTERN]<br>DETECTED VOLTAGE :LOW<br>DETECTED CURRENT :ZERO |

FIG. 14

[SW1:OFF-SEIZURE]

| | ON/OFF SWITCH:SW2 | |
|---|---|---|
| | ON SIGNAL | OFF SIGNAL |
| ON/OFF SWITCH:SW1 — ON SIGNAL | [FIRST DETERMINATION PATTERN]<br>DETECTED VOLTAGE :HIGH<br>DETECTED CURRENT :ZERO | [THIRD DETERMINATION PATTERN]<br>DETECTED VOLTAGE :LOW<br>DETECTED CURRENT :ZERO |
| ON/OFF SWITCH:SW1 — OFF SIGNAL | [SECOND DETERMINATION PATTERN]<br>DETECTED VOLTAGE :HIGH<br>DETECTED CURRENT :ZERO | [FOURTH DETERMINATION PATTERN]<br>DETECTED VOLTAGE :LOW<br>DETECTED CURRENT :ZERO |

FIG. 15A

[SW1:ON-SEIZURE]

| | ON/OFF SWITCH:SW2 | |
|---|---|---|
| | ON SIGNAL | OFF SIGNAL |
| ON/OFF SWITCH:SW1 — ON SIGNAL | [FIRST DETERMINATION PATTERN]<br>DETECTED VOLTAGE :HIGH<br>DETECTED CURRENT :DISCHARGE | [THIRD DETERMINATION PATTERN]<br>DETECTED VOLTAGE :HIGH<br>DETECTED CURRENT :WEAK DISCHARGE |
| ON/OFF SWITCH:SW1 — OFF SIGNAL | [SECOND DETERMINATION PATTERN]<br>DETECTED VOLTAGE :HIGH<br>DETECTED CURRENT :DISCHARGE | [FOURTH DETERMINATION PATTERN]<br>DETECTED VOLTAGE :HIGH<br>DETECTED CURRENT :WEAK DISCHARGE |

FIG. 15B

[SW2:OFF-SEIZURE]

| | | ON/OFF SWITCH:SW2 | |
|---|---|---|---|
| | | ON SIGNAL | OFF SIGNAL |
| ON/OFF SWITCH:SW1 | ON SIGNAL | [FIRST DETERMINATION PATTERN]<br>DETECTED VOLTAGE :HIGH<br>DETECTED CURRENT :WEAK DISCHARGE | [THIRD DETERMINATION PATTERN]<br>DETECTED VOLTAGE :HIGH<br>DETECTED CURRENT :WEAK DISCHARGE |
| | OFF SIGNAL | [SECOND DETERMINATION PATTERN]<br>DETECTED VOLTAGE :LOW<br>DETECTED CURRENT :ZERO | [FOURTH DETERMINATION PATTERN]<br>DETECTED VOLTAGE :LOW<br>DETECTED CURRENT :ZERO |

FIG. 16A

[SW2:ON-SEIZURE]

| | | ON/OFF SWITCH:SW2 | |
|---|---|---|---|
| | | ON SIGNAL | OFF SIGNAL |
| ON/OFF SWITCH:SW1 | ON SIGNAL | [FIRST DETERMINATION PATTERN]<br>DETECTED VOLTAGE :HIGH<br>DETECTED CURRENT :DISCHARGE | [THIRD DETERMINATION PATTERN]<br>DETECTED VOLTAGE :HIGH<br>DETECTED CURRENT :DISCHARGE |
| | OFF SIGNAL | [SECOND DETERMINATION PATTERN]<br>DETECTED VOLTAGE :HIGH<br>DETECTED CURRENT :ZERO | [FOURTH DETERMINATION PATTERN]<br>DETECTED VOLTAGE :HIGH<br>DETECTED CURRENT :ZERO |

FIG. 16B

VEHICLE POWER SOURCE

CROSS-REFERENCE TO RELATED APPLICATIONS

The present application claims priority from Japanese Patent Application No. 2015-073431 filed on Mar. 31, 2015, the entire contents of which are hereby incorporated by reference.

BACKGROUND

The technology relates to a vehicle power source that may be mounted on a vehicle.

As a vehicle power source that may be mounted on a vehicle, a power source has been developed that allows electric power to be charged not only in a lead battery but also in a lithium ion battery; the electric power may be generated by an alternator in deceleration of a vehicle (refer to Japanese Unexamined Patent Application Publication (JP-A) No. 2014-36557). This makes it possible to regenerate much electric power in the deceleration of a vehicle, leading to enhancement in energy efficiency of the vehicle.

As described in JP-A No. 2014-36557, a vehicle power source may be provided with a switch that controls a coupling state of components such as, but not limited to, an alternator and a lithium ion battery. Such a switch of the vehicle power source may be switched to a conductive state or a cut-off state in accordance with a charge and discharge state. If a failure such as, but not limited to, a closed seizure and an opened seizure should occur in the switch, proper functioning of the vehicle power source may become difficult. It is therefore desired to determine presence or absence of a switch failure.

SUMMARY

It is desirable to determine a failure in a switch provided in a vehicle power source.

An aspect of the technology provides a vehicle power source mounted on a vehicle, the vehicle power source including: a generator coupled to an engine and including an output terminal; a first power storage coupled to the generator and including a positive electrode terminal; a second power storage coupled, in parallel with the first storage, to the generator, and including a positive electrode terminal; a first switch switched based on a control signal, between a conductive state and a cut-off state, the conductive state involving coupling of the generator to the first power storage, and the cut-off state involving separation of the generator from the first power storage; a second switch switched based on a control signal, between a conductive state and a cut-off state, the conductive state involving coupling of the generator to the second power storage, and the cut-off state involving separation of the generator from the second power storage; a connection point that couples a first conduction path, a second conduction path, and a third conduction path to one another, the first conduction path being coupled to the positive electrode terminal of the first power storage, the second conduction path being coupled to the positive electrode terminal of the second power storage, and the third conduction path being coupled to the output terminal of the generator; and a failure determiner that executes failure determination processing that involves determining a failure in one or both of the first switch and the second switch, based on the control signal of the first switch, the control signal of the second switch, a current of the first conduction path, and a potential of the first conduction path.

BRIEF DESCRIPTION OF THE DRAWINGS

FIG. 14 summarizes detected voltages and detected currents in the determination patterns.

FIGS. 15A and 15B summarize detected voltages and detected currents in the determination patterns.

FIGS. 16A and 16B summarize detected voltages and detected currents in the determination patterns.

DETAILED DESCRIPTION

Figure 1:
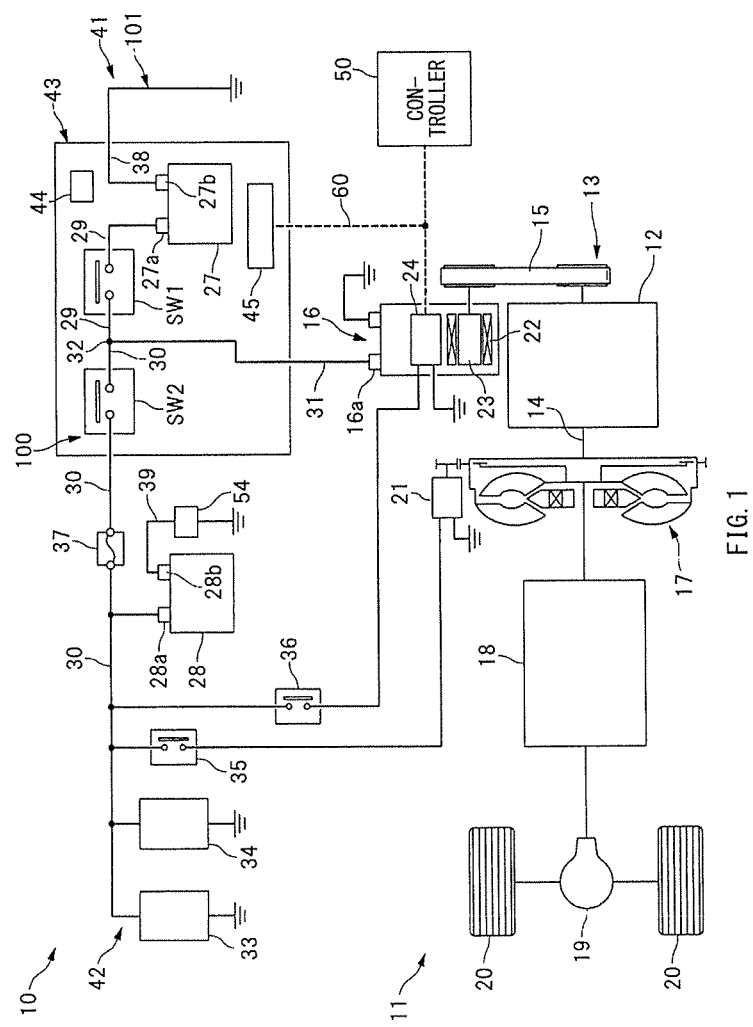
FIG. 1 schematically illustrates a configuration example of a vehicle including a vehicle power source according to an implementation of the technology.

In the following, some implementations of the technology are described in detail with reference to the drawings. FIG. 1 schematically illustrates a configuration example of a vehicle 11 including a vehicle power source 10 according to an implementation of the technology. Referring to FIG. 1, the vehicle 11 may include a power unit 13 having an engine 12. The engine 12 may include a crank shaft 14 to which a motor generator 16 may be coupled through a belt mechanism 15. Thus, the motor generator 16 is mechanically coupled to the engine 12. In one embodiment of the technology, the motor generator 16 may serve as a "generator". A transmission mechanism 18 may be also coupled to the engine 12 through a torque converter 17. One or more wheels 20 may be coupled to the transmission mechanism 18 through a differential mechanism 19 or other parts. The power unit 13 may further include a starter motor 21 that causes starting revolution of the crank shaft 14.

The motor generator 16 may be a so-called ISG (integrated starter generator). Not only may the motor generator 16 serve as a generator that is driven by the crank shaft 14 to generate power, the motor generator 16 may also serve as an electric motor that causes the starting revolution of the crank shaft 14. The motor generator 16 may include a stator 22 and a rotor 23; the stator 22 may include a stator coil, and the rotor 23 may include a field coil. The motor generator 16 may further include an ISG controller 24, in order to control energized states of the stator coil and the field coil. The ISG controller 24 may include an inverter, a regulator, a microcomputer, and other parts. A sensor 24a may be coupled to the ISG controller 24a. The sensor 24a detects a generated voltage and a generated current of the motor generator 16.

In allowing the motor generator 16 to serve as a generator, the energized state of the field coil may be controlled by the ISG controller 24. Controlling the energized state of the field coil makes it possible to control the generated voltage of the motor generator 16. In allowing the motor generator 16 to be driven to generate power, controlling the inverter of the ISG controller 24 makes it possible to control the generated current of the motor generator 16. In allowing the motor generator 16 to serve as an electric motor, the energized state of the stator coil may be controlled by the ISG controller 24. Note that the ISG controller 24 may control the energized states of the field coil and the stator coil, based on a control signal from a control unit 50, as described later.

Figure 2:
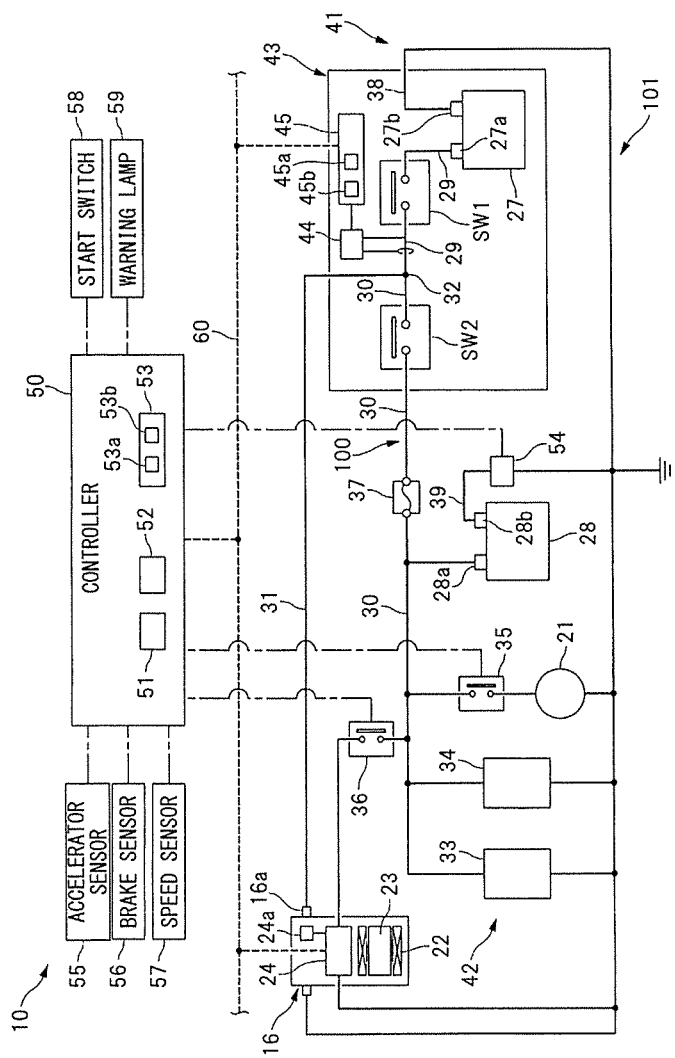
FIG. 2 is a block diagram of a configuration example of the vehicle power source.
Figure 3:
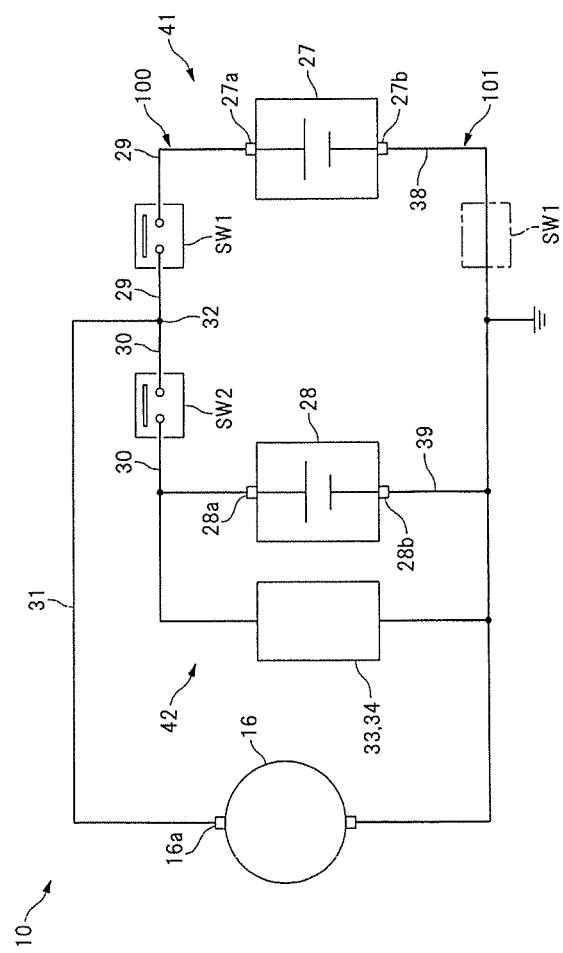
FIG. 3 is a simplified circuit diagram of a configuration of the vehicle power source.

Description is given next of a configuration of the vehicle power source 10. FIG. 2 is a block diagram of a configuration example of the vehicle power source 10. FIG. 3 is a simplified circuit diagram of a configuration of the vehicle power source 10. Referring to FIGS. 1 to 3, the vehicle power source 10 includes a lithium ion battery 27 and a lead battery 28. In one implementation of the technology, the lithium ion battery 27 may serve as a "first power storage", and the lead battery 28 may serve as a "second power storage". The lithium ion battery 27 is coupled to the motor generator 16. The lead battery 28 is coupled, in parallel with the lithium ion battery 27, to the motor generator 16. A first power line 29 is coupled to a positive electrode terminal 27a of the lithium ion battery 27. A second power line 30 is coupled to a positive electrode terminal 28a of the lead battery 28. In one implementation of the technology, the first power line 29 may serve as a "first conduction path", and the second power line 30 may serve as a "second conduction path". Moreover, the motor generator 16 includes an output terminal 16a that outputs the generated current of the motor generator 16. A charge line 31 is coupled to the output terminal 16a. In one implementation of the technology, the charge line 31 may serve as a "third conduction path". The first power line 29, the second power line 30, and the charge line 31 are coupled to one another through a node 32. In one implementation of the technology, the node 32 may serve as a "connection point". In other words, the first power line 29, the second power line 30, and the charge line 31 may constitute a conduction path 100; the positive electrode terminals 27a and 28a of the lithium ion battery 27 and the lead battery 28 may be coupled to each other through the conduction path 100.

The first power line 29 may be provided with an ON/OFF switch SW1. The second power line 30 may be provided with an ON/OFF switch SW2. In one implementation of the technology, the ON/OFF switches SW1 and SW2 may respectively serve as a "first switch" and a "second switch". Note that the ON/OFF switch SW2 may be inserted between the positive electrode terminal 28a and the node 32 in the second power line 30. The ON/OFF switches SW1 and SW2 each may operate in a closed state or a conductive state (i.e., an ON state) and in an open state or a cut-off state (i.e., an OFF state). In other words, the ON/OFF switch SW1 is switched between the conductive state and the cut-off state; the conductive state involves electrical coupling of the motor generator 16 to the lithium ion battery 27; and the cut-off state involves electrical separation of the motor generator 16 from the lithium ion battery 27. Similarly, the ON/OFF switch SW2 is switched between the conductive state and the cut-off state; the conductive state involves electrical coupling of the motor generator 16 to the lead battery 28; and the cut-off state involves electrical separation of the motor generator 16 from the lead battery 28.

To the second power line 30, loads such as, but not limited to, an instantaneous voltage drop protection load 33 and a vehicle body load 34 may be coupled. Also, the starter motor 21 may be coupled to the second power line 30 through a starter relay 35, and the ISG controller 24 may be coupled to the second power line 30 through an ISG relay 36. Furthermore, the second power line 30 may be provided with a fuse 37 that protects the instantaneous voltage drop protection load 33, the vehicle body load 34, the starter motor 21, the ISG controller 24, and other loads or components. Note that, in the illustrated example, the ON/OFF switch SW1 may be inserted in the first power line 29, but this is non-limiting. As indicated by a dashed line in FIG. 3, the ON/OFF switch SW1 may be inserted in a conduction line 38 coupled to a negative electrode terminal 27b of the lithium ion battery 27. In one implementation of the technology, the conduction line 38 may serve as a "fourth conduction path". In other words, the conduction line 38 and a conduction line 39 may constitute a conduction path 101; the negative electrode terminal 27b of the lithium ion battery 27 and a negative electrode terminal 28b of the lead battery 28 may be coupled to each other through the conduction path 101. The ON/OFF switch SW1 may be inserted in the conduction line 38 that forms the conduction path 101.

As illustrated in FIGS. 1 and 2, the vehicle power source 10 may include a first power circuit 41 that includes the lithium ion battery 27 and the motor generator 16. The vehicle power source 10 may also include a second power circuit 42 that includes components such as, but not limited to, the lead battery 28, the instantaneous voltage drop protection load 33, the vehicle body load 34, and the starter motor 21. The first power circuit 41 and the second power circuit 42 may be coupled to each other through the ON/OFF switch SW2. Furthermore, the vehicle power source 10 may include a battery module 43. In the battery module 43, the lithium ion battery 27 and the ON/OFF switches SW1 and SW2 may be incorporated.

As illustrated in FIG. 2, the battery module 43 may include a battery sensor 44 that detects a state of charge, charge and discharge currents, a terminal voltage, temperature, and other characteristics of the lithium ion battery 27. The battery sensor 44 may also detect a current and a potential of the first power line 29, i.e., a current and a potential between the node 32 and the ON/OFF switch SW1 in the first power line 29. Note that the potential of the first power line 29 may be detected as a potential difference (i.e., a voltage) with respect to a reference potential. Moreover, the battery module 43 may include a battery controller 45 that includes, for example, a drive circuit and a microcomputer. The battery controller 45 may include a drive circuit 45a and a drive circuit 45b. The drive circuit 45a may generate a control current of the ON/OFF switch SW1. The drive circuit 45b may generate a control current of the ON/OFF switch SW2. The battery controller 45 may allow the ON/OFF switches SW1 and SW2 to be switched between the conductive state and the cut-off state, based on control signals from the control unit 50, as described later. Also, the battery controller 45 may open the ON/OFF switch SW1 to separate the lithium ion battery 27 from the vehicle power source 10, when excessive charge and discharge currents or an increase in temperature of the lithium ion battery 27 is detected. Note that, though not illustrated, the battery controller 45 may be coupled to the second power line 30, similarly to the ISG controller 24 as mentioned above.

As mentioned above, the instantaneous voltage drop protection load 33 may be coupled to the second power line 30. The instantaneous voltage drop protection load 33 is an electrical device that ought to be kept in operation during engine restart in idling stop control, as described later. Non-limiting examples of the instantaneous voltage drop protection load 33 may include engine auxiliaries, a brake actuator, a power steering actuator, an instrumental panel, and various electronic control units. Also, the vehicle body load 34 may be coupled to the second power line 30. The vehicle body load 34 is an electrical device whose instantaneous shut-down is allowed during the engine restart in the idling stop control. Non-limiting examples of the vehicle body load 34 may include a door mirror motor, a power window motor, and a radiator fan motor.

As illustrated in FIG. 2, the vehicle power source 10 may include a control unit 50 that controls the motor generator 16, the battery module 43, and other parts. The control unit 50 may include a charge and discharge controller 51 that controls charge and discharge of the lithium ion battery 27. In one implementation of the technology, the charge and discharge controller 51 may serve as a "power generation controller". The charge and discharge controller 51 may determine, based on input signals from other controllers or sensors, the state of charge of the lithium ion battery 27, operation states of an accelerator pedal and a brake pedal, and other states. Based on the state of charge of the lithium ion battery 27, and other states, the charge and discharge controller 51 may control a state of power generation of the motor generator 16, to control charge and discharge of the lithium ion battery 27. Note that the charge and discharge controller 51 may include, for example, a microcomputer and a drive circuit. The microcomputer may include a CPU, ROM, RAM, and other components. The drive circuit may generate control currents of various actuators.

The control unit 50 may include an ISS controller 52 that executes the idling stop control. In one implementation of the technology, the ISS controller 52 may serve as an "engine controller". The idling stop control is control that involves automatically stopping the engine 12 based on a predetermined condition and automatically restarting the engine 12 based on a predetermined condition. The ISS controller 52 may determine, based on input signals from other controllers or sensors, a stop condition and a start condition of the engine 12. The ISS controller 52 may automatically stop the engine 12 when the stop condition is established, and may automatically restart the engine 12 when the start condition is established. A non-limiting example of the stop condition of the engine 12 may be that a vehicle speed is equal to or lower than a predetermined vehicle speed and the brake pedal is stepped down. Non-limiting examples of the start condition of the engine 12 may include that stepping down of the brake pedal is released, and that the accelerator pedal is stepped down. Note that the ISS controller 52 may include, for example, a microcomputer and a drive circuit. The microcomputer may include a CPU, ROM, RAM, and other components. The drive circuit may generate control currents of various actuators. The term "ISS" for the ISS controller 52 is an abbreviation of "idling stop system".

The control unit 50 may include a switch controller 53 that executes ON/OFF control of the ON/OFF switches SW1 and SW2. The switch controller 53 may include a switch control part 53a and a failure determination part 53b. The switch control part 53a may output control signals toward the ON/OFF switches SW1 and SW2. The failure determination part 53b may determine whether or not the ON/OFF switches SW1 and SW2 fail. The switch control part 53a may generate, based on input signals from other controllers or sensors, the control signals of the ON/OFF switches SW1 and SW2, and may output the generated control signals toward the battery controller 45. Note that the control signals of the ON/OFF switches SW1 and SW2 may include a conduction signal, i.e., an ON signal and a cut-off signal, i.e., an OFF signal. The conduction signal allows the ON/OFF switches SW1 and SW2 to be switched to the conductive state. The cut-off signal allows the ON/OFF switches SW1 and SW2 to be switched to the cut-off state. The failure determination part 53b may execute, based on input signals from other controllers or sensors, failure determination processing at a predetermined timing. The failure determination processing involves determining a failure in the ON/OFF switches SW1 and SW2. Note that the switch controller 53 may include, for example, a microcomputer and a drive circuit. The microcomputer may include a CPU, ROM, RAM, and other components. The drive circuit may generate control currents of various actuators.

The control unit 50 may be coupled to sensors such as, but not limited to, a battery sensor 54, an accelerator sensor 55, and a brake sensor 56. The battery sensor 54 detects charge and discharge currents, a state of charge, and other characteristics of the lead battery 28. The accelerator sensor 55 detects an amount of stepping down of the accelerator pedal. The brake sensor 56 detects an amount of stepping down of the brake pedal. The control unit 50 may be also coupled to other sensors such as, but not limited to, a vehicle speed sensor 57 and a start switch 58. The vehicle speed sensor 57 detects a vehicle speed, i.e. a traveling speed of the vehicle 11. The start switch 58 is manually operated by an occupant. Furthermore, the control unit 50 may be coupled to a warning lamp 59 that informs an occupant of abnormality of the vehicle power source 10.

The start switch 58 may be coupled to the control unit 50 and may be a switch that is manually operated by an occupant in starting a vehicle control system or in starting the engine 12. In one implementation of the technology, the start switch 58 may serve as a "start-up switch". For example, when the start switch 58 is a push button, pushing down of the start switch 58 without stepping down the brake pedal may allow for selection of start-up or shut-down of the vehicle control system. Pushing down of the start switch 58 with the brake pedal stepped down may allow for start-up of the vehicle control system and start of the engine 12. Thus, the start switch 58 in the figure may be a switch that is operated, by a push-down operation, to start-up side or to start-up stop side.

The control unit 50, the motor generator 16, the battery module 43, and other parts may be coupled to one another through an on-vehicle network 60 such as, but not limited to, CAN and LIN. Specifically, the ISG controller 24, the battery controller 45, the charge and discharge controller 51, the ISS controller 52, the switch controller 55, and various sensors may be coupled communicably through the on-vehicle network 60. Through the on-vehicle network 60, the control unit 50 may receive, from the ISG controller 24, the generated voltage, the generated current, and other characteristics of the motor generator 16, and may receive, from the battery controller 45, the state of charge, the discharge current, and other characteristics of the lithium ion battery 27. The control unit 50 may determine an operation state of the vehicle power source 10 and a traveling state of the vehicle 11, and may output a control signal to the ISG controller 24 and the battery controller 45.

[Voltage Characteristics of Batteries]

Figure 4:
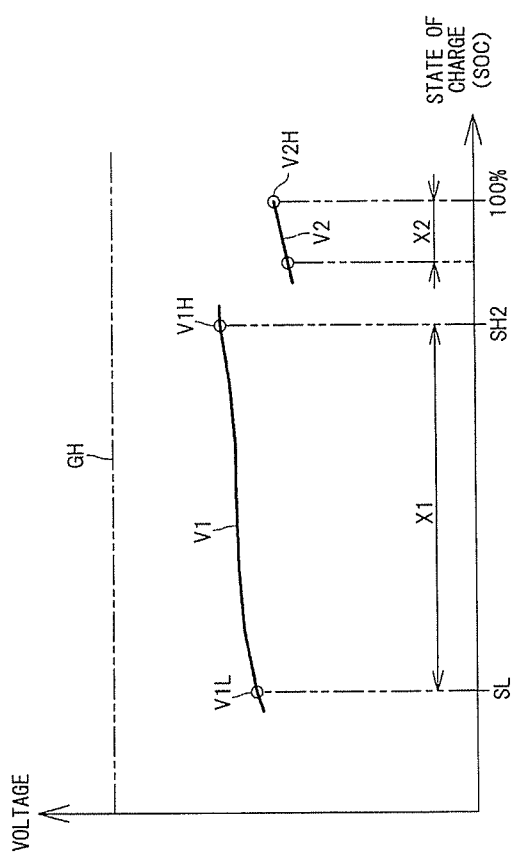
FIG. 4 is a diagram of relations between terminal voltages and states of charge in batteries.

Description is given next of voltage characteristics of the lithium ion battery 27 and the lead battery 28. FIG. 4 is a diagram of relations between terminal voltages and the states of charge SOC in the batteries. Note that a state of charge SOC is a value that indicates a degree of charge of a battery, or a ratio of remaining capacity to design capacity of a battery. In FIG. 4, terminal voltages V1 and V2 indicate battery voltages with no current flowing therethrough, i.e., an open end voltage. Also, in FIG. 4, a reference GH indicates a maximum generated voltage of the motor generator 16.

Referring to FIG. 4, the terminal voltage V1 of the lithium ion battery 27 may be set higher than the terminal voltage V2 of the lead battery 28. In other words, a lower limit voltage V1L of a charge and discharge range X1 of the lithium ion battery 27 may be set higher than an upper limit voltage V2H of a charge and discharge range X2 of the lead battery 28. Moreover, the terminal voltage V1 of the lithium ion battery 27 may be set lower than an upper limit (e.g., 16 V) of a charge voltage of the lead battery 28. In other words, an upper limit voltage V1H of the charge and discharge range X1 of the lithium ion battery 27 may be set lower than the upper limit of the charge voltage of the lead battery 28. This makes it possible to avoid excessive charge of the lead battery 28 by the lithium ion battery 27 even in a case of parallel connection of the lithium ion battery 27 and the lead battery 28, and to avoid deterioration of the lead battery 28. Note that an upper limit of a charge voltage is an upper limit value of a charge voltage, specified for each type of power storage in view of suppression of deterioration of a power storage.

As illustrated in FIG. 4, the lithium ion battery 27 may be provided with the broad charge and discharge range X1, owing to good cycle characteristics of the lithium ion battery 27. In contrast, the lead battery 28 may be provided with the narrow charge and discharge range X2 near full charge, in view of prevention of battery deterioration. Moreover, internal resistance of the lithium ion battery 27 may be set lower than internal resistance of the lead battery 28. In other words, the internal resistance of the lead battery 28 may be set higher than the internal resistance of the lithium ion battery 27.

[Power Generation Control of Motor Generator]

Figure 5:
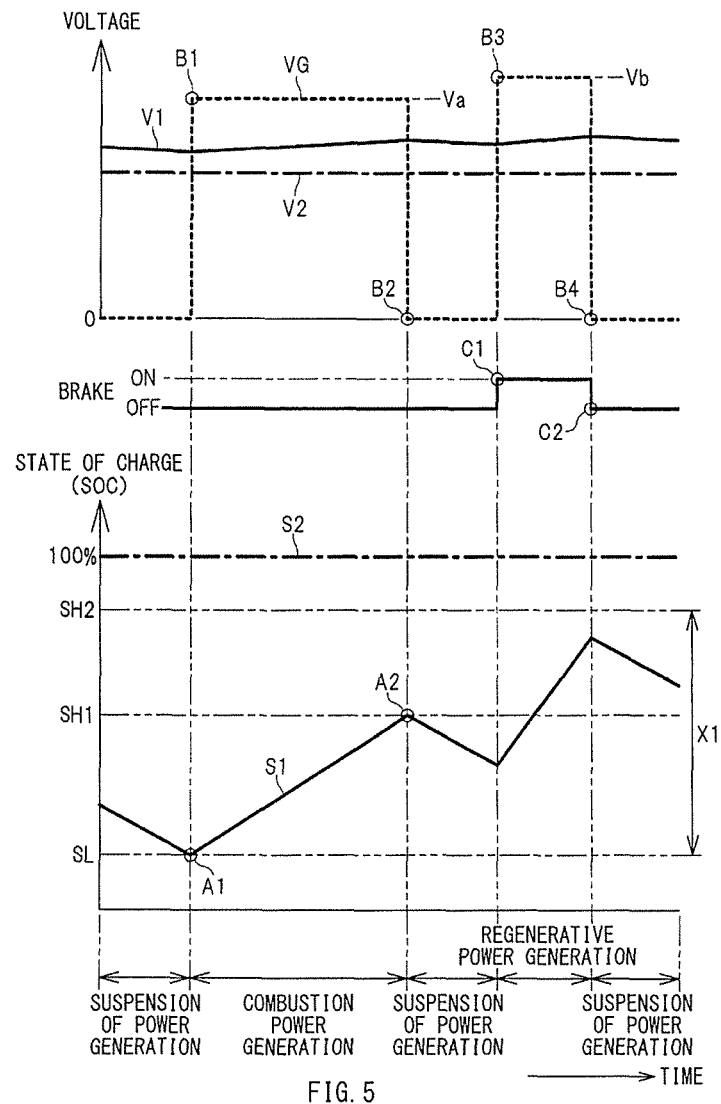
FIG. 5 is a time chart of an example of power generation control of a motor generator.

Description is given next of power generation control of the motor generator 16. FIG. 5 is a time chart of an example of the power generation control of the motor generator 16. FIG. 5 indicates the generated voltage VG of the motor generator 16, the terminal voltage V1 and the state of charge S1 of the lithium ion battery 27, and the terminal voltage V2 and the state of charge S2 of the lead battery 28. In FIG. 5, "brake ON" means that the brake pedal is stepped down, and "brake OFF" means that the stepping down of the brake pedal is released.

Referring to FIG. 5, the state of charge S1 of the lithium ion battery 27 may be controlled within the charge and discharge range X1. For example, when the state of charge S1 of the lithium ion battery 27 is lowered to a lower limit SL in accordance with discharge, the motor generator 16 may be controlled to a power generation state, allowing the lithium ion battery 27 to be charged. Here, the power generation state of the motor generator 16 may include a combustion power generation state and a regenerative power generation state. The combustion power generation state may involve allowing the motor generator 16 to generate power with use of engine power, and converting fuel energy to electric energy. The regenerative power generation state may involve allowing the motor generator 16 to generate power in vehicle deceleration, and converting kinetic energy of the vehicle 11 to electric energy. To improve energy efficiency of the vehicle 11 to enhance fuel consumption performance, it is desirable to facilitate the regenerative power generation state of the motor generator 16 while restraining the combustion power generation state of the motor generator 16, allowing suppression of an amount of fuel consumption of the engine 12. In other words, it is desirable to allow the lithium ion battery 27 to positively store regenerative electric power of the motor generator 16, and to discharge the regenerative electric power from the lithium ion battery 27 to the vehicle body load 34 or other parts, restraining the combustion power generation state of the motor generator 16.

Whether to control the motor generator 16 to the combustion power generation state or not may be determined based on the state of charge S1 of the lithium ion battery 27. Specifically, the charge and discharge controller 51 may control the motor generator 16 to the combustion power generation state when the state of charge S1 is lowered to the lower limit SL. Then, the charge and discharge controller 51 may keep the combustion power generation state of the motor generator 16 until the state of charge S1 reaches a first upper limit SH1. Whether to control the motor generator 16 to the regenerative power generation state or not may be determined based on the operation states of the accelerator pedal and the brake pedal. Specifically, the charge and discharge controller 51 may control the motor generator 16 to the regenerative power generation state, in the vehicle deceleration when the stepping down of the accelerator pedal is released, or in the vehicle deceleration when the brake pedal is stepped down. Then, the charge and discharge controller 51 may cancel the regenerative power generation state of the motor generator 16 in a case of the stepping down of the accelerator pedal, or in a case of the release of the stepping down of the brake pedal, and may control the motor generator 16 to a power generation suspension state. Note that, with the motor generator 16 controlled in the regenerative power generation state, when the state of charge S1 increases to a second upper limit SH2, the regenerative power generation state of the motor generator 16 may be cancelled in order to prevent excessive charge of the lithium ion battery 27; and the motor generator 16 may be controlled to the power generation suspension state.

[Power Supply States of Vehicle Power Source]

Figure 6:
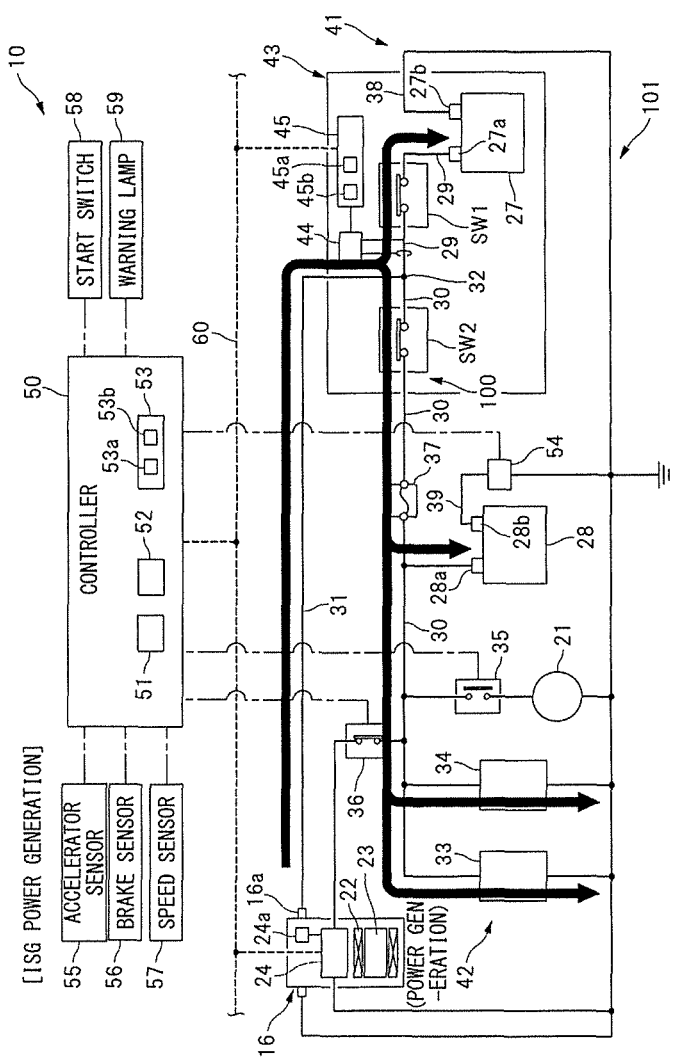
FIG. 6 illustrates a state of power supply of the vehicle power source.
Figure 7:
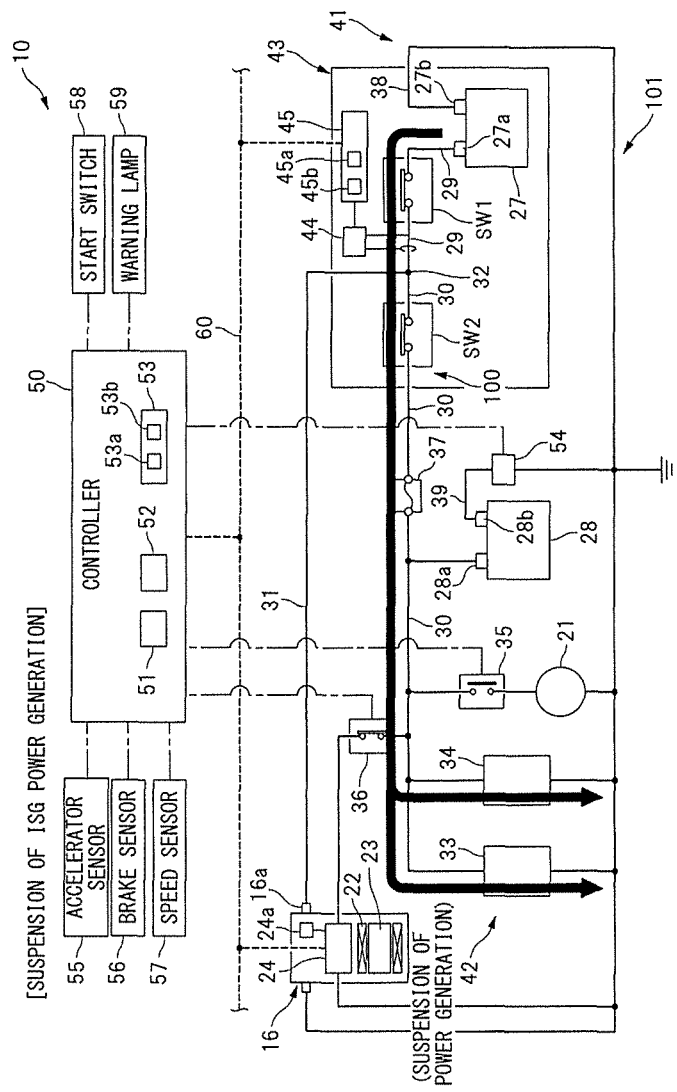
FIG. 7 illustrates a state of power supply of the vehicle power source.

Description is now given of power supply states of the vehicle power source 10. FIGS. 6 and 7 illustrate the power supply states of the vehicle power source 10. FIG. 6 illustrates the power supply state in charging the lithium ion battery. FIG. 7 illustrates the power supply state in discharging the lithium ion battery.

First, as illustrated in FIG. 5, when the state of charge S1 of the lithium ion battery 27 is lowered to the lower limit SL (as denoted by a reference A1), the charge and discharge controller 51 may control the motor generator 16 to the combustion power generation state. In the combustion power generation state, the generated voltage VG of the motor generator 16 may be raised to a predetermined voltage Va higher than the terminal voltage V1 of the lithium ion battery 27 (as denoted by a reference B1). Here, referring to FIG. 6, in raising the generated voltage VG of the motor generator 16 above the terminal voltage V1 of the lithium ion battery 27, the ON/OFF switches SW1 and SW2 in the battery module 43 may be kept in the closed state. Thus, as denoted by an arrow in FIG. 6, the generated power of the motor generator 16 may be supplied to the lithium ion battery 27, the lead battery 28, the instantaneous voltage drop protection load 33, and the vehicle body load 34.

Controlling the motor generator 16 to the combustion power generation state as described may cause the lithium ion battery 27 to be charged, allowing the state of charge S1 of the lithium ion battery 27 to increase gradually. As illustrated in FIG. 5, when the state of charge S1 reaches the first upper limit SH1 (as denoted by a reference A2), the charge and discharge controller 51 may control the motor generator 16 to the power generation suspension state. In the power generation suspension state, the generated voltage VG of the motor generator 16 may be lowered to "zero" lower than the terminal voltage V1 of the lithium ion battery 27 (as denoted by a reference B2). Here, referring to FIG. 7, in lowering the generated voltage VG of the motor generator 16 below the terminal voltage V1 of the lithium ion battery 27, the ON/OFF switches SW1 and SW2 in the battery module 43 may be kept in the closed state. Thus, as denoted by an arrow in FIG. 7, the electric power stored in the lithium ion battery 27 may be supplied to the instantaneous voltage drop protection load 33 and the vehicle body load 34, and discharge of the lead battery 28 may be suppressed. Basically, the electric power stored in the lead battery 28 may also be supplied to the instantaneous voltage drop protection load 33 and the vehicle body load 34. When the state of charge of the lead battery 28 is lowered, the electric power stored in the lithium ion battery 27 may be supplied also to the lead battery 28.

Next, as illustrated in FIG. 5, when the brake pedal is stepped down (as denoted by a reference C1), the charge and discharge controller 51 may control the motor generator 16 to the regenerative power generation state. In the regenerative power generation state, the generated voltage VG of the motor generator 16 may be raised to a predetermined voltage Vb higher than the terminal voltage V1 of the lithium ion battery 27 (as denoted by a reference B3). Here, as illustrated in FIG. 6, in raising the generated voltage VG of the motor generator 16 above the terminal voltage V1 of the lithium ion battery 27, the ON/OFF switches SW1 and SW2 in the battery module 43 may be kept in the closed state. Thus, as denoted by an arrow in FIG. 6, the generated power of the motor generator 16 may be supplied to the lithium ion battery 27, the lead battery 28, the instantaneous voltage drop protection load 33, and the vehicle body load 34.

Thereafter, as illustrated in FIG. 5, when the stepping down of the brake pedal is released (as denoted by a reference C2), the charge and discharge controller 51 may control the motor generator 16 to the power generation suspension state. In the power generation suspension state, the generated voltage VG of the motor generator 16 may be lowered to "zero" lower than the terminal voltage V1 of the lithium ion battery 27 (as denoted by a reference B4). Here, as illustrated in FIG. 7, in lowering the generated voltage VG of the motor generator 16 below the terminal voltage V1 of the lithium ion battery 27, the ON/OFF switches SW1 and SW2 in the battery module 43 may be kept in the closed state. Thus, as denoted by an arrow in FIG. 7, the electric power stored in the lithium ion battery 27 may be supplied to the instantaneous voltage drop protection load 33 and the vehicle body load 34. When the state of charge of the lead battery 28 is lowered, the electric power stored in the lithium ion battery 27 may be supplied also to the lead battery 28.

As described so far, controlling the generated voltage VG of the motor generator 16 makes it possible to control charge and discharge of the lithium ion battery 27. Specifically, raising the generated voltage VG above the terminal voltage V1 allows the lithium ion battery 27 to be charged, while lowering the generated voltage VG below the terminal voltage V1 allows the lithium ion battery 27 to discharge. Moreover, the terminal voltage V1 of the lithium ion battery 27 is set higher than the terminal voltage V2 of the lead battery 28. This makes it possible to allow for charge and discharge of the lithium ion battery 27 with the ON/OFF switches SW1 and SW2 kept in the closed state. In other words, it is possible to allow the lithium ion battery 27 to discharge without electrically separating the lead battery 28 from the lithium ion battery 27, positively allowing for charge and discharge of the lithium ion battery 27 without complicating a circuit structure and switch control of the vehicle power source 10. Hence, it is possible to enhance energy efficiency of the vehicle 11 and to reduce costs of the vehicle power source 10.

As illustrated in FIG. 6, in allowing the motor generator 16 to generate power, it is possible to positively charge the lithium ion battery 27, while suppressing charge of the lead battery 28. Specifically, since the internal resistance of the lithium ion battery 27 is smaller than the internal resistance of the lead battery 28, it is possible to positively charge the lithium ion battery 27 while suppressing charge of the lead battery 28. Moreover, as illustrated in FIG. 7, in allowing the motor generator 16 to suspend power generation, it is possible to positively allow the lithium ion battery 27 to discharge, while suppressing discharge of the lead battery 28. Specifically, since the terminal voltage V1 of the lithium ion battery 27 is higher than the terminal voltage V2 of the lead battery 28, it is possible to positively allow the lithium ion battery 27 to discharge, while suppressing discharge of the lead battery 28. Such suppression of charge and discharge of the lead battery 28 makes it possible to relieve requests for output characteristics and cycle characteristics of the lead battery 28, leading to reduction in costs of the lead battery 28. From this viewpoint as well, it is possible to reduce costs of the vehicle power source 10.

Note that, in the forgoing description, in lowering the generated voltage VG below the terminal voltage V1, the motor generator 16 may be controlled to the power generation suspension state. However, this is non-limiting. It is possible to allow the lithium ion battery 27 to discharge even when the generated voltage VG is lowered below the terminal voltage V1 while maintaining the power generation state of the motor generator 16. At this occasion, adjusting the generated current of the motor generator 16 may allow for control of the discharge current of the lithium ion battery 27. Specifically, increasing the generated current of the motor generator 16 may allow for a decrease in the discharge current of the lithium ion battery 27, while decreasing the generated current of the motor generator 16 may allow for an increase in the discharge current of the lithium ion battery 27.

[Engine Start Control]

Figure 8:
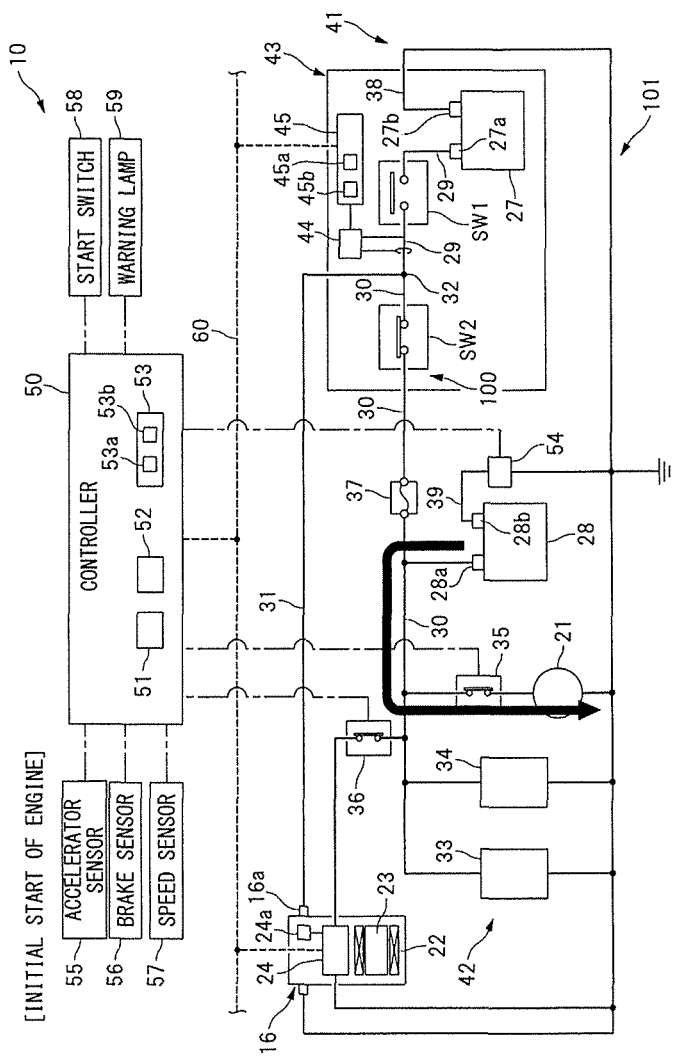
FIG. 8 illustrates a state of power supply of the vehicle power source.
Figure 9:
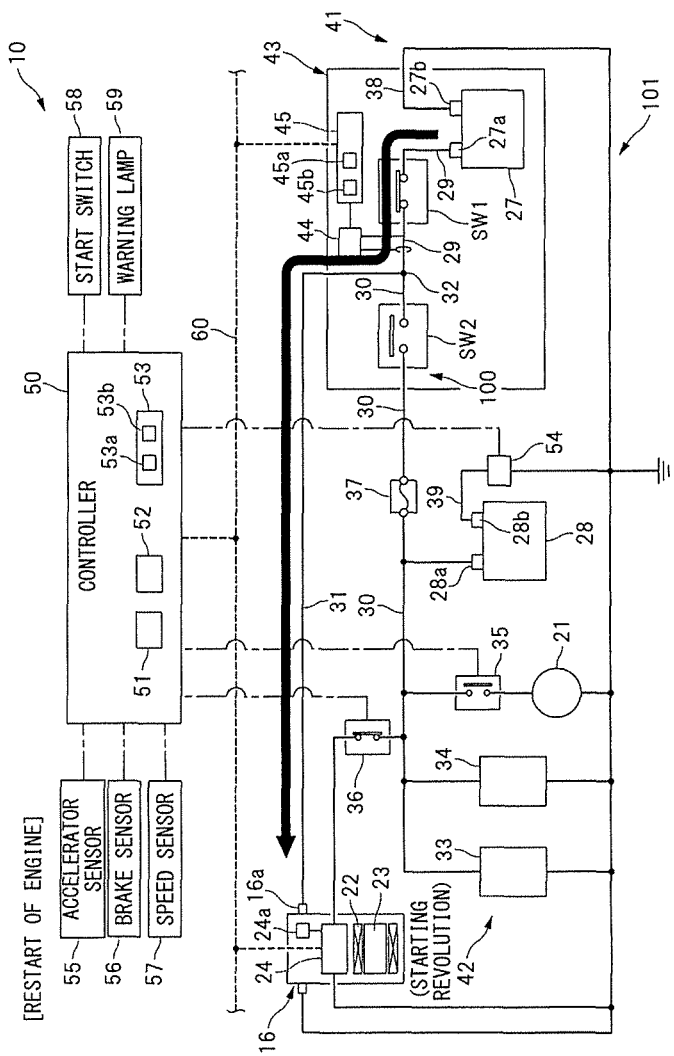
FIG. 9 illustrates a state of power supply of the vehicle power source.

Description is given next of the power supply states of the vehicle power source 10 at engine start. FIGS. 8 and 9 illustrate the power supply states of the vehicle power source 10. FIG. 8 illustrates the power supply state at initial start of the engine by operation of the start switch. FIG. 9 illustrates the power supply state at engine restart by idling stop control.

Referring to FIG. 8, at the initial start of the engine by the operation of the start switch by a driver, the engine 12 may be started by the starter motor 21. Specifically, at the initial start of the engine by the operation of the start switch, the ON/OFF switch SW2 in the battery module 43 may be closed, and thereafter the starter relay 35 may be closed. This may cause power supply from the lead battery 28 to the starter motor 21, allowing the engine 12 to be started by cranking operation of the starter motor 21. Note that the ON/OFF switch SW1 in the battery module 43 may be closed after the engine 12 is started. In the forgoing description, the ON/OFF switch SW1 may be opened in view of suppression of discharge of the lithium ion battery 27. However, this is non-limiting. For example, under a low temperature environment such as, but not limited to, a cold district, the ON/OFF switches SW1 and SW2 may be closed to allow the starter motor 21 to be supplied with power from both the lead battery 28 and the lithium ion battery 27.

Referring to FIG. 9, at the engine restart by the idling stop control, the engine 12 may be started by the motor generator 16. Specifically, at the engine restart by the idling stop control, the ON/OFF switch SW2 in the battery module 43 may be opened, and thereafter a target drive torque of the motor generator 16 may be raised. This may cause power supply from the lithium ion battery 27 to the motor generator 16, allowing the engine 12 to be started by the cranking operation of the motor generator 16. At the engine restart by the idling stop control, the ON/OFF switch SW2 may be opened to electrically separate the first power circuit 41 from the second power circuit 42. This makes it possible to prevent an instantaneous voltage drop of the second power circuit 42 with respect to the instantaneous voltage drop protection load 33. Hence, it is possible to keep the instantaneous voltage drop protection load 33 in operation during the engine restart, leading to enhanced vehicle quality.

[Failure Diagnosis of ON/OFF Switches SW1 and SW2]

Description is now given on switch diagnosis control executed by the vehicle power source 10. As described above, the ON/OFF switches SW1 and SW2 may be switched to the conductive state and the cut-off state in accordance with operation states of the vehicle power source 10. However, if a failure such as, but not limited to, a closed seizure and an opened seizure should occur in the ON/OFF switches SW1 and SW2, proper operation of the vehicle power source 10 may become difficult. The switch controller 53 therefore switches the ON/OFF switches SW1 and SW2 in accordance with a predetermined determination pattern, while executing switch diagnosis control that involves determining presence or absence of a failure in the ON/OFF switches SW1 and SW2. Here, a closed seizure (i.e., an ON seizure) in the ON/OFF switch SW1 or SW2 is a failure in which the ON/OFF switch SW1 or SW2 becomes unswitchable in the conductive state in which the ON/OFF switch SW1 or SW2 is closed. An opened seizure (i.e., an OFF seizure) in the ON/OFF switch SW1 or SW2 is a failure in which the ON/OFF switch SW1 or SW2 becomes unswitchable in the cut-off state in which the ON/OFF switch SW1 or SW2 is opened.

In the switch diagnosis control, determination may be made on whether or not the ON/OFF switches SW1 and SW2 fail, based on the current and the potential of the first power line 29, i.e., the current and the potential between the node 32 and the ON/OFF switch SW1 in the first power line 29. In the following description, the current of the first power line 29 detected by the battery sensor 44, i.e., the current flowing through between the node 32 and the ON/OFF switch SW1 is referred to as a "detected current". Moreover, as mentioned above, the battery sensor 44 detects the potential of the first power line 29 as a potential difference (i.e., a voltage) with respect to a reference potential. The voltage of the first power line 29 detected by the battery sensor 44, i.e., the potential at a point between the node 32 and the ON/OFF switch SW1 is referred to as a "detected voltage". Note that, in the following description, the switch diagnosis control may be executed with use of the current flowing through between the node 32 and the ON/OFF switch SW1. However, this is non-limiting. For example, the switch diagnosis control may be executed with use of a current flowing through between the ON/OFF switch SW1 and the positive electrode terminal 27a.

Description is given below of a method of diagnosis of failure in the ON/OFF switches SW1 and SW2 by the switch diagnosis control. FIGS. 10 to 13 each illustrate a state of execution of a determination pattern in the switch diagnosis control. FIG. 14 summarizes detected voltages and detected currents in the determination patterns. In FIG. 14 are summarized the detected voltages and the detected currents in a case in which the ON/OFF switches SW1 and SW2 are normal. Note that, in executing the switch diagnosis control, in order to stabilize the detected voltage and the detected current, the engine 12 may be stopped to allow the motor generator 16 to suspend power generation. In FIG. 14, the term "High" for the detected voltage means that the detected voltage exceeds a predetermined voltage, and the term "Low" for the detected voltage means that the detected voltage is below a predetermined voltage. The term "discharge" for the detected current means that the detected current exceeds a predetermined current, and the term "weak discharge" for the detected current means that the detected current is below a predetermined current. The term "zero" for the detected current means that no current is detected as the detected current.

[First Determination Pattern]

Figure 10:
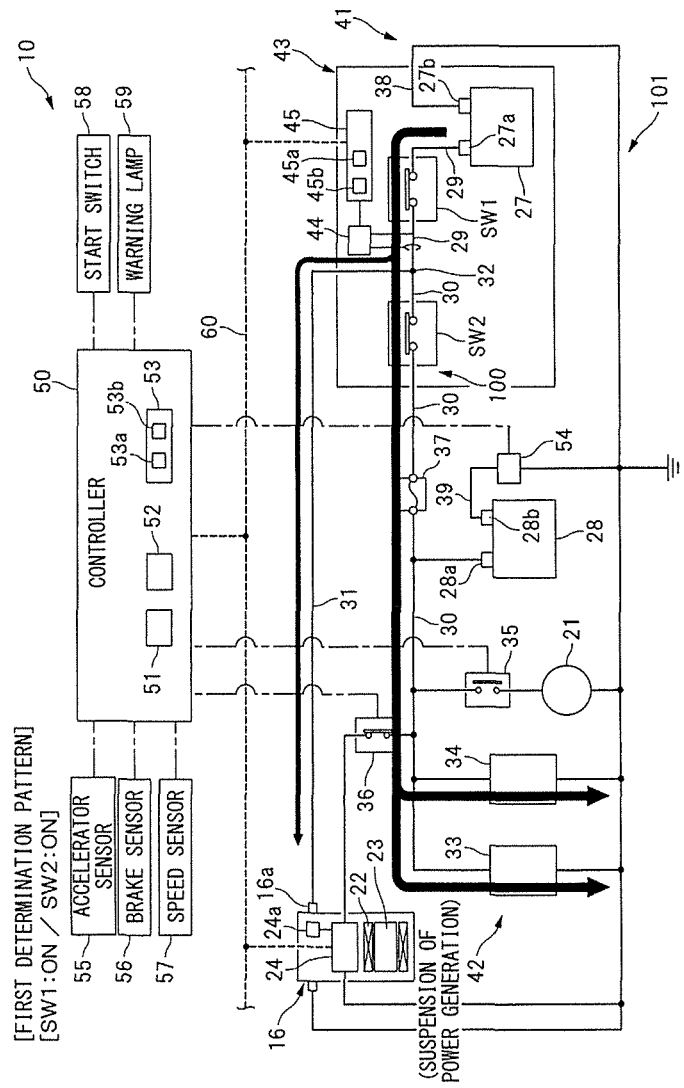
FIG. 10 illustrates a state of execution of a determination pattern in switch diagnosis control.

Referring to FIGS. 10 to 13, four determination patterns may be provided as the determination patterns in the switch diagnosis control. As illustrated in FIG. 10, the determination patterns may include a first determination pattern in which the ON/OFF switch SW1 is supplied with the ON signal and the ON/OFF switch SW2 is supplied with the ON signal. In the first determination pattern, the ON/OFF switch SW1 may be closed, causing the terminal voltage of the lithium ion battery 27 to be applied to the first power line 29. Moreover, in the first determination pattern, the ON/OFF switches SW1 and SW2 may be closed, causing a current to be supplied to the instantaneous voltage drop protection load 33 and the vehicle body load 34 from the lithium ion battery 27 through the first power line 29 and the second power line 30. Also, a minute current may be supplied to the motor generator 16 from the lithium ion battery 27 through the first power line 29 and the charge line 31. Accordingly, as summarized in FIG. 14, when the ON/OFF switches SW1 and SW2 are normal, in accordance with the first determination pattern, feeding the ON/OFF switches SW1 and SW2 with the ON signals may cause the detected voltage to be "High" and the detected current to be "discharge".

[Second Determination Pattern]

Figure 11:
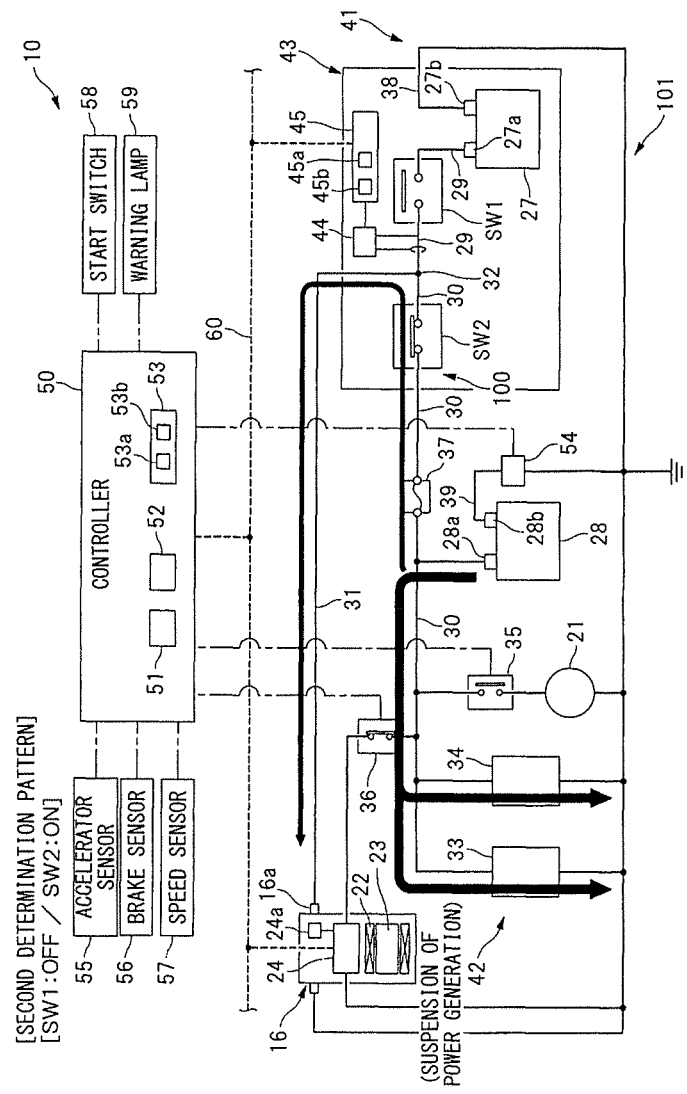
FIG. 11 illustrates a state of execution of a determination pattern in the switch diagnosis control.

As illustrated in FIG. 11, the determination patterns may include a second determination pattern in which the ON/OFF switch SW1 is supplied with an OFF signal and the ON/OFF switch SW2 is supplied with the ON signal. In the second determination pattern, the ON/OFF switch SW2 may be closed, causing the terminal voltage of the lead battery 28 to be applied to the first power line 29. Moreover, in the second determination pattern, the ON/OFF switch SW1 may be opened, causing interruption of power supply to the first power line 29. Note that a current may be supplied to the instantaneous voltage drop protection load 33 and the vehicle body load 34 from the lead battery 28 through the second power line 30. Furthermore, a minute current may be supplied to the motor generator 16 from the lead battery 28 through the second power line 30 and the charge line 31. Accordingly, as summarized in FIG. 14, when the ON/OFF switches SW1 and SW2 are normal, in accordance with the second determination pattern, feeding the ON/OFF switch SW1 with the OFF signal while feeding the ON/OFF switch SW2 with the ON signal may cause the detected voltage to be "High" and the detected current to be "zero".

[Third Determination Pattern]

Figure 12:
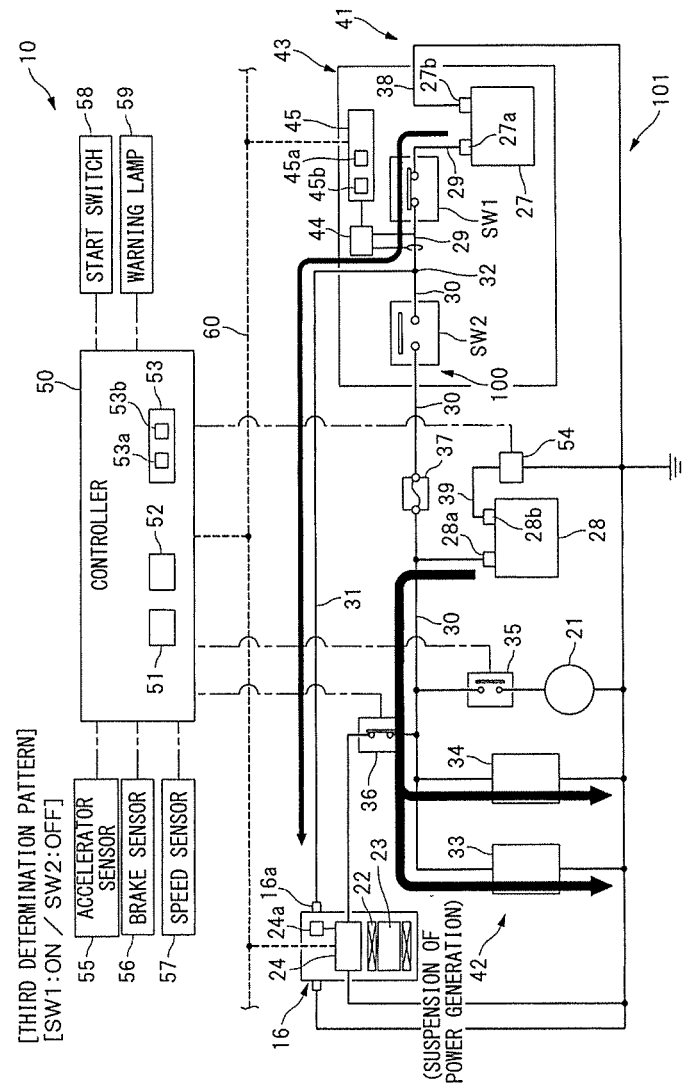
FIG. 12 illustrates a state of execution of a determination pattern in the switch diagnosis control.

As illustrated in FIG. 12, the determination patterns may include a third determination pattern in which the ON/OFF switch SW1 is supplied with the ON signal and the ON/OFF switch SW2 is supplied with the OFF signal. In the third determination pattern, the ON/OFF switch SW1 may be closed, causing the terminal voltage of the lithium ion battery 27 to be applied to the first power line 29. Moreover, in the third determination pattern, the ON/OFF switch SW2 may be opened, causing a minute current to be supplied to the motor generator 16 from the lithium ion battery 27 through the first power line 29 and the charge line 31. Accordingly, as summarized in FIG. 14, when the ON/OFF switches SW1 and SW2 are normal, in accordance with the third determination pattern, feeding the ON/OFF switch SW1 with the ON signal while feeding the ON/OFF switch SW2 with the OFF signal may cause the detected voltage to be "High" and the detected current to be "weak discharge".

[Fourth Determination Pattern]

Figure 13:
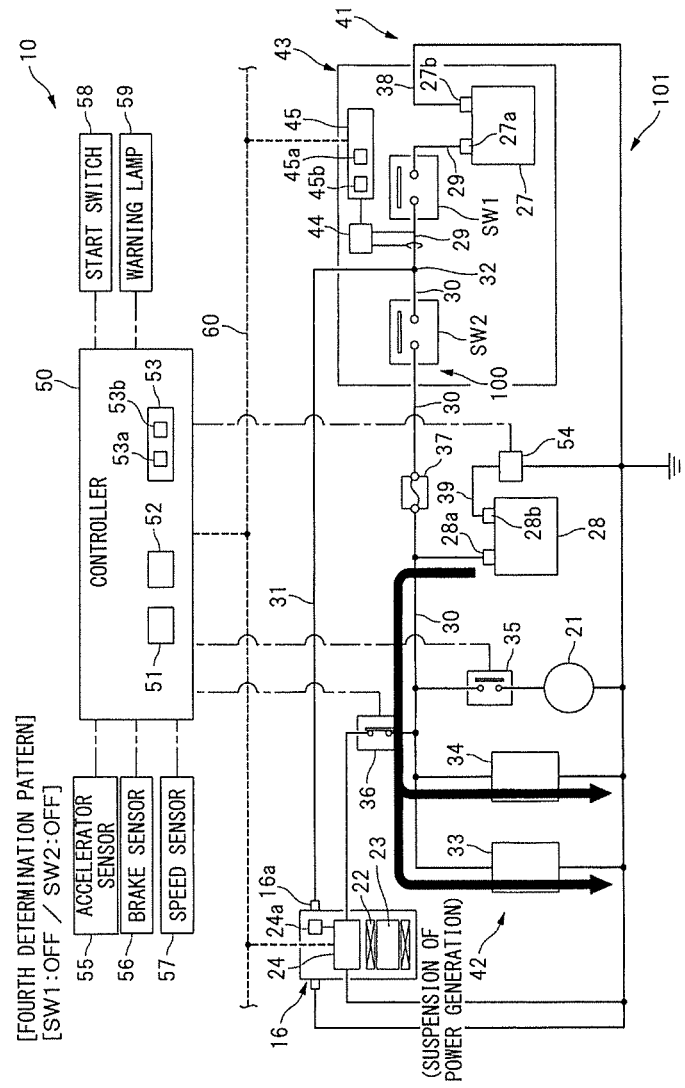
FIG. 13 illustrates a state of execution of a determination pattern in the switch diagnosis control.

As illustrated in FIG. 13, the determination patterns may include a fourth determination pattern in which the ON/OFF switch SW1 is supplied with the OFF signal and the ON/OFF switch SW2 is supplied with the OFF signal. In the fourth determination pattern, the ON/OFF switches SW1 and SW2 may be opened, causing no application of the terminal voltages of the lithium ion battery 27 and the lead battery 28 to the first power line 29. Moreover, in the fourth determination pattern, since the ON/OFF switch SW1 is opened, power supply to the first power line 29 may be interrupted. Note that a current may be supplied to the instantaneous voltage drop protection load 33 and the vehicle body load 34 from the lead battery 28 through the second power line 30. Accordingly, as summarized in FIG. 14, when the ON/OFF switches SW1 and SW2 are normal, in accordance with the fourth determination pattern, feeding the ON/OFF switches SW1 and SW2 with the OFF signals may cause the detected voltage to be "Low" and the detected current to be "zero".

[Failure in the ON/OFF switch SW1]

Description is given next of a failure in the ON/OFF switch SW1. FIGS. 15A and 15B summarize the detected voltages and the detected currents in the determination patterns. FIG. 15A summarizes a state with the OFF seizure of the ON/OFF switch SW1. FIG. 15B summarizes a state with the ON seizure of the ON/OFF switch SW1.

When the OFF seizure occurs in the ON/OFF switch SW1, the ON/OFF switch SW1 may maintain the OFF state even in a case with the ON signal outputted to the ON/OFF switch SW1 from the switch control part 53a. Accordingly, as shown hatched in FIG. 15A, when the ON/OFF switches SW1 and SW2 are controlled in accordance with the first determination pattern and the third determination pattern, there may occur detected voltages and detected currents that are different from those of the case in which the switches are normal. Specifically, the ON/OFF switch SW1 is fixed to the OFF state, causing, in the first determination pattern, occurrence of detected voltages and detected currents that are same as those of the second determination pattern, while causing, in the third determination pattern, occurrence of detected voltages and detected currents that are same as those of the fourth determination pattern.

When the ON seizure occurs in the ON/OFF switch SW1, the ON/OFF switch SW1 may maintain the ON state even in a case with the OFF signal outputted to the ON/OFF switch SW1 from the switch control part 53a. Accordingly, as shown hatched in FIG. 15B, when the ON/OFF switches SW1 and SW2 are controlled in accordance with the second determination pattern and the fourth determination pattern, there occurs detected voltages and detected currents that are different from those of the case in which the switches are normal. Specifically, the ON/OFF switch SW1 may be fixed to the ON state, causing, in the second determination pattern, occurrence of detected voltages and detected currents that are same as those of the first determination pattern, while causing, in the fourth determination pattern, occurrence of detected voltages and detected currents that are same as those of the third determination pattern.

[Failure in the ON/OFF switch SW2]

Description is given next of a failure in the ON/OFF switch SW2. FIGS. 16A and 16B summarize the detected voltages and the detected currents in the determination patterns. FIG. 16A summarizes a state with the OFF seizure of the ON/OFF switch SW2. FIG. 16B summarizes a state with the ON seizure of the ON/OFF switch SW2.

When the OFF seizure occurs in the ON/OFF switch SW2, the ON/OFF switch SW2 may maintain the OFF state even in a case with the ON signal outputted to the ON/OFF switch SW2 from the switch control part 53a. Accordingly, as shown hatched in FIG. 16A, when the ON/OFF switches SW1 and SW2 are controlled in accordance with the second determination pattern, there occurs detected voltages and detected currents that are different from those of the case in which the switches are normal. Specifically, the ON/OFF switch SW2 may be fixed to the OFF state, causing, in the second determination pattern, occurrence of detected voltages and detected currents that are same as those of the fourth determination pattern.

When the ON seizure occurs in the ON/OFF switch SW2, the ON/OFF switch SW2 may maintain the ON state even in a case with the OFF signal outputted to the ON/OFF switch SW2 from the switch control part 53a. Accordingly, as shown hatched in FIG. 16B, when the ON/OFF switches SW1 and SW2 are controlled in accordance with the fourth determination pattern, there occurs detected voltages and detected currents that are different from those of the case in which the switches are normal. Specifically, the ON/OFF switch SW2 may be fixed to the ON state, causing, in the fourth determination pattern, occurrence of detected voltages and detected currents that are same as those of the second determination pattern.

[Switch Diagnosis Control]

Figure 17:
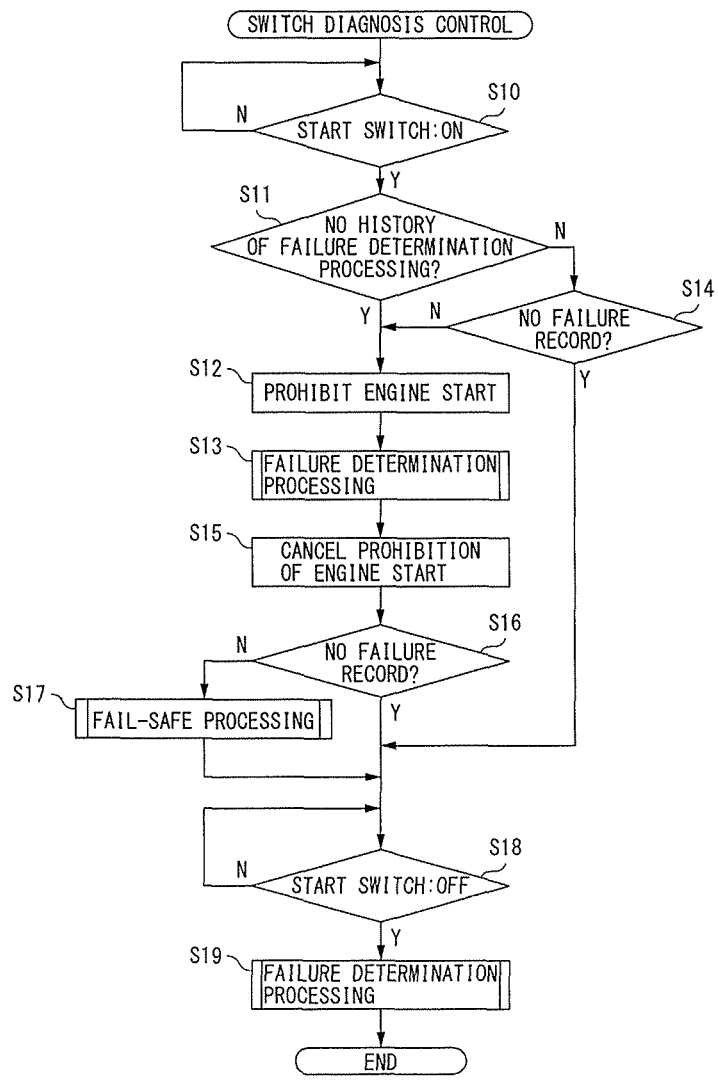
FIG. 17 is a flowchart of an example of a procedure of executing the switch diagnosis control.

Description is given next of a procedure of executing the switch diagnosis control by the switch controller 53. FIG. 17 is a flowchart of an example of the procedure of executing the switch diagnosis control. Referring to FIG. 17, in step S10, determination may be made on whether or not the start switch 58 is operated to the start-up side (i.e., ON operated). In step S10, when an ON operation of the start switch 58 is detected, the flow may proceed to step S11. In step S11, determination may be made on presence or absence of history of failure determination processing with regard to the ON/OFF switches SW1 and SW2. In step S11, when determination is made that there is no history of the failure determination processing, that is, when the failure determination processing on the ON/OFF switches SW1 and SW2 has never been executed so far, the flow may proceed to step S12, and then, to step S13. In step S12, the start of the engine 12 may be prohibited. In step S13, the failure determination processing on the ON/OFF switches SW1 and SW2 may be executed. A specific procedure of the failure determination processing is separately described.

In step S11, when determination is made that there is history of the failure determination processing, that is, when the failure determination processing on the ON/OFF switches SW1 and SW2 has been executed before, the flow may proceed to step S14. In step S14, determination may be made on presence or absence of failure record with regard to one or both of the ON/OFF switches SW1 and SW2. In step S14, when there is the failure record of one or both of the ON/OFF switches SW1 and SW2, that is, when the ON seizure and the OFF seizure of the ON/OFF switches SW1 and SW2 have been recorded, the flow may proceed to step S12, and then, to step S13. In step S12, the start of the engine 12 may be prohibited. In step S13, the failure determination processing on the ON/OFF switches SW1 and SW2 may be executed anew.

In step S13, when the failure determination processing on the ON/OFF switches SW1 and SW2 is completed, the flow may proceed to step S15, and then, to step S16. In step S15, the prohibition of the start of the engine 12 may be cancelled. In step S16, determination may be made on the presence or absence of the failure record with regard to one or both of the ON/OFF switches SW1 and SW2. In step S16, when there is the failure record of one or both of the ON/OFF switches SW1 and SW2, that is, when the ON seizure and the OFF seizure of the ON/OFF switches SW1 and SW2 have been recorded, the flow may proceed to step S17. In step S17, fail-safe processing that copes with a failure in the ON/OFF switches SW1 and SW2 may be executed. A specific procedure of the fail-safe processing is separately described.

In steps S14 and S16, when determination is made that there is no failure record of one or both of the ON/OFF switches SW1 and SW2, or, in step S17, when the fail-safe processing is executed, the flow may proceed to step S18. In step S18, determination may be made on whether or not the start switch 58 is operated to the start-up stop side (i.e., OFF operated). In step S18, when an OFF operation of the start switch 58 is detected, the flow may proceed to step S19. In step S19, the failure determination processing on the ON/OFF switches SW1 and SW2 may be executed anew.

As illustrated in FIG. 17, the failure determination processing on the ON/OFF switches SW1 and SW2 may be executed both in a case in which the start switch 58 is operated to the start-up side and in a case in which the start switch 58 is operated to the start-up stop side. As described, in the failure determination processing on the ON/OFF switches SW1 and SW2, in order to suspend power generation of the motor generator 16 to stabilize the detected voltage and the detected current, the start of the engine 12 may be prohibited until the completion of the failure determination processing. Accordingly, when the start switch 58 is operated to the start-up side, the execution of the failure determination processing on the ON/OFF switches SW1 and SW2 may be limited to the case with no history i.e., execution record of the failure determination processing, and to the case with the failure record of one or both of the ON/OFF switches SW1 and SW2. This makes it possible to avoid excessive execution of the failure determination processing on the ON/OFF switches SW1 and SW2, allowing for quick start of the engine 12. Moreover, when the start switch 58 is operated to the start-up stop side, the failure determination processing on the ON/OFF switches SW1 and SW2 may be executed regardless of the failure record of the ON/OFF switches SW1 and SW2 and other factors. Thus, the failure determination processing on the ON/OFF switches SW1 and SW2 may be executed every time the start switch 58 is operated to the start-up stop side. This makes it possible to early detect a failure in the ON/OFF switches SW1 and SW2.

[Failure Determination Processing]

Figure 18:
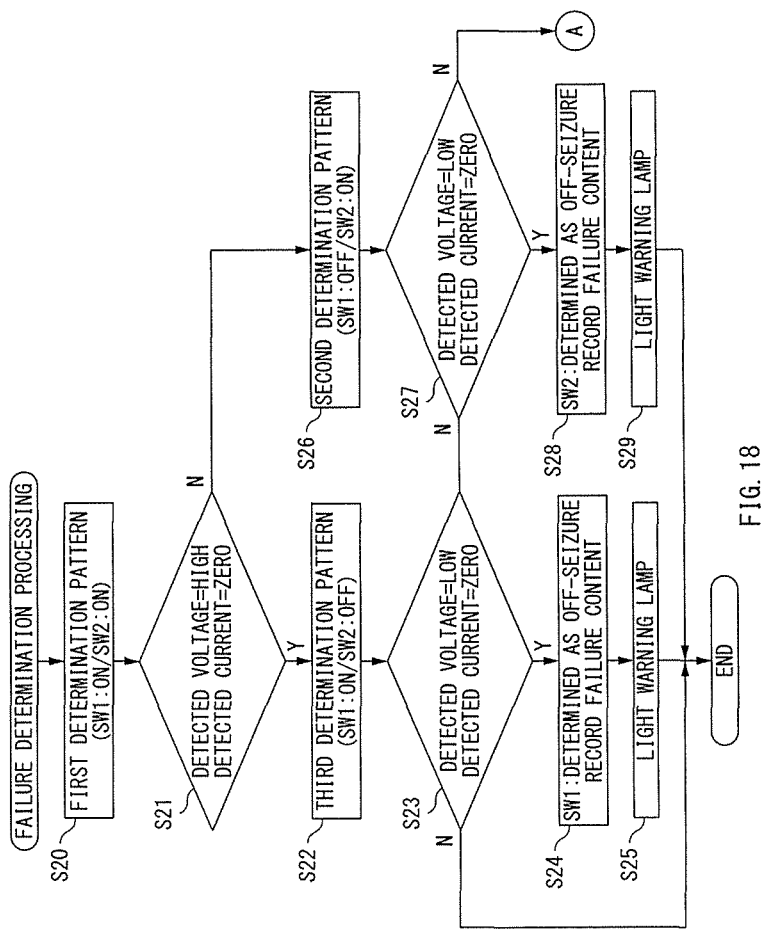
FIG. 18 is a flowchart of an example of a procedure of executing failure determination processing.
Figure 19:
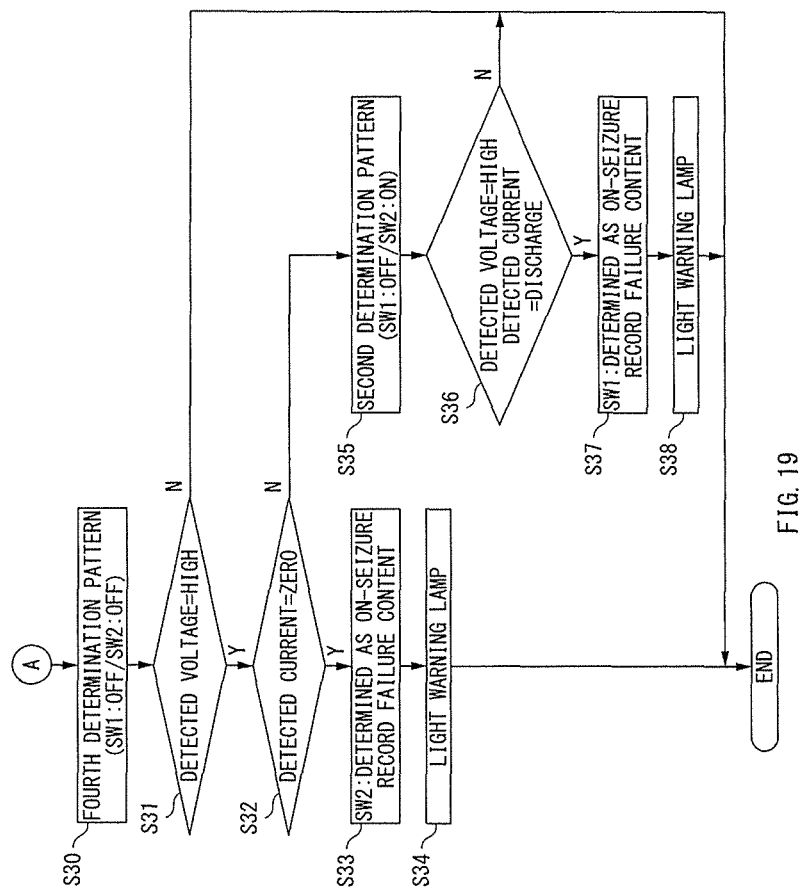
FIG. 19 is a flowchart of an example of the procedure of executing the failure determination processing.

Description is given next of the failure determination processing in the switch diagnosis control. FIGS. 18 and 19 are flowcharts of an example of a procedure of executing the failure determination processing. Note that the flowcharts of FIGS. 18 and 19 are to be linked to each other at a position of a reference A.

Referring to FIG. 18, in step S20, in accordance with the first determination pattern, the ON/OFF switch SW1 may be supplied with the ON signal and the ON/OFF switch SW2 may be supplied with the ON signal. Next, in step S21, determination may be made on whether or not the detected voltage is "High" and the detected current is "zero". In step S21, when the detected voltage is "High" and the detected current is "zero", the flow may proceed to step S22. In step S22, in accordance with the third determination pattern, the ON/OFF switch SW1 may be supplied with the ON signal and the ON/OFF switch SW2 may be supplied with the OFF signal. Subsequently, in step S23, determination may be made on whether or not the detected voltage is "Low" and the detected current is "zero". In step S23, when the detected voltage is "Low" and the detected current is "zero", the flow may proceed to step S24. In step S24, determination may be made that the ON/OFF switch SW1 has the OFF seizure, and the OFF seizure of the ON/OFF switch SW1 may be stored in the failure determination part 53b. In other words, as shown hatched in FIG. 15A, since there is a difference in the detected voltages and the detected currents in the first determination pattern and in the third determination pattern, determination may be made that the ON/OFF switch SW1 has the OFF seizure. When such determination is made on the OFF seizure of the ON/OFF switch SW1, the flow may proceed to step S25. In step S25, the warning lamp 59 may be lighted to inform an occupant of a failure in the ON/OFF switch SW1.

In step S21, when the detected voltage is "Low", or when the detected current is "discharge" or "weak discharge", the flow may proceed to step S26. In step S26, in accordance with the second determination pattern, the ON/OFF switch SW1 may be supplied with the OFF signal and the ON/OFF switch SW2 may be supplied with the ON signal. Next, in step S27, determination may be made on whether or not the detected voltage is "Low" and the detected current is "zero". In step S27, when the detected voltage is "Low" and the detected current is "zero", the flow may proceed to step S28. In step S28, determination may be made that the ON/OFF switch SW2 has the OFF seizure, and the OFF seizure of the ON/OFF switch SW2 may be stored in the failure determination part 53b. In other words, as shown hatched in FIG. 16A, since there is a difference in the detected voltages and the detected currents in the second determination pattern, determination may be made that the ON/OFF switch SW2 has the OFF seizure. When such determination is made on the OFF seizure of the ON/OFF switch SW2, the flow may proceed to step S29. In step S29, the warning lamp 59 may be lighted to inform an occupant of a failure in the ON/OFF switch SW2.

In step S27, when the detected voltage is "High", or when the detected current is "weak discharge", as illustrated in FIG. 19, the flow may proceed to step S30. In step S30, in accordance with the fourth determination pattern, the ON/OFF switch SW1 may be supplied with the OFF signal and the ON/OFF switch SW2 may be supplied with the OFF signal. Next, in step S31, determination may be made on whether or not the detected voltage is "High". In step S31, when the detected voltage is "High", the flow may proceed to step S32. In step S32, determination may be made on whether or not the detected current is "zero". In step S32, when the detected current is "zero", the flow may proceed to step S33. In step S33, determination may be made that the ON/OFF switch SW2 has the ON seizure, and the ON seizure of the ON/OFF switch SW2 may be stored in the failure determination part 53b. In other words, as shown hatched in FIG. 16B, since there is a difference in the detected voltages and the detected currents in the fourth determination pattern, determination may be made that the ON/OFF switch SW2 has the ON seizure. When such determination is made on the ON seizure of the ON/OFF switch SW2, the flow may proceed to step S34. In step S34, the warning lamp 59 may be lighted to inform an occupant of a failure in the ON/OFF switch SW2.

In step S32, when the detected current is "discharge" or "weak discharge", in accordance with the second determination pattern, the ON/OFF switch SW1 may be supplied with the OFF signal and the ON/OFF switch SW2 may be supplied with the ON signal. Next, in step S36, determination may be made on whether the detected voltage is "High" and the detected current is "discharge". In step S36, when the detected voltage is "High" and the detected current is "discharge", the flow may proceed to step S37. In step S37, determination may be made that the ON/OFF switch SW1 has the ON seizure, and the ON seizure of the ON/OFF switch SW1 may be stored in the failure determination part 53b. In other words, as shown hatched in FIG. 15B, since there is a difference in the detected voltages and the detected currents in the second determination pattern and in the fourth determination pattern, determination may be made that the ON/OFF switch SW1 has the ON seizure. When such determination is made on the ON seizure of the ON/OFF switch SW1, the flow may proceed to step S38. In step S38, the warning lamp 59 may be lighted to inform an occupant of a failure in the ON/OFF switch SW1.

As described so far, the control signals of the ON/OFF switches SW1 and SW2 may be switched while comparing the detected voltages and the detected currents to the voltages and the currents in the normal state, making it possible to determine a failure in the ON/OFF switches SW1 and SW2. Specifically, the switch controller 53 may execute, as the failure determination processing, first determination processing (steps S20 and S21) and second determination processing (steps S26, S27, S35, and S36). The first determination processing may involve determining the detected voltages and the detected currents in accordance with the first determination pattern. The second determination processing may involve determining the detected voltages and the detected currents in accordance with the second determination pattern. The switch controller 53 may also execute, as the failure determination processing, third determination processing (steps S22 and S23) and fourth determination processing (steps S30, S31, and S32). The third determination processing may involve determining the detected voltages and the detected currents in accordance with the third determination pattern. The fourth processing may involve determining the detected voltages and the detected currents in accordance with the fourth determination pattern. This makes it possible to determine the ON seizure and the OFF seizure of the ON/OFF switch SW1, and to determine the ON seizure and the OFF seizure of the ON/OFF switch SW2.

[Fail-Safe Processing]

Figure 20:
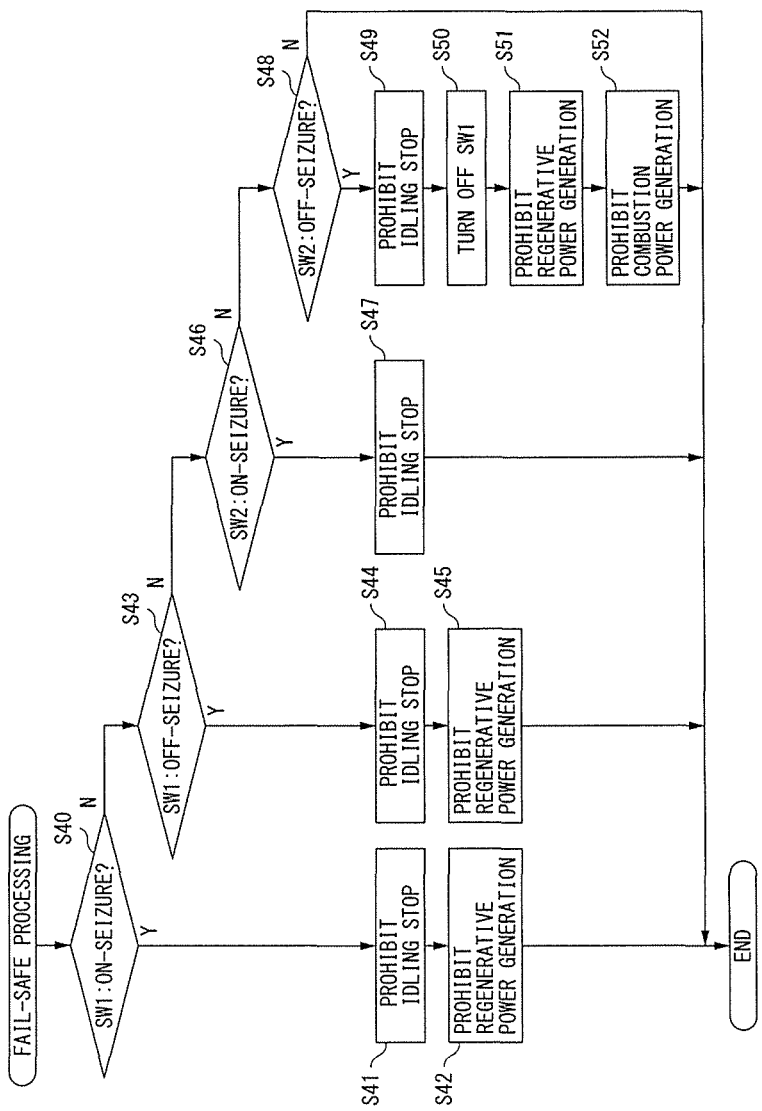
FIG. 20 is a flowchart of an example of a procedure of executing fail-safe processing.

Description is now given of the fail-safe processing in the switch diagnosis control. As described, if the ON seizure and the OFF seizure should occur in the ON/OFF switches SW1 and SW2, proper control of the vehicle power source 10 may become difficult. The control unit 50 that includes various controllers 51, 52 and 53 may therefore execute the fail-safe processing that allows the vehicle power source 10 to cope with a failure state of the ON/OFF switches SW1 and SW2. FIG. 20 is a flowchart of an example of a procedure of executing the fail-safe processing.

Referring to FIG. 20, in step S40, determination may be made on whether or not the ON/OFF switch SW1 has the ON seizure. In step S40, when the ON/OFF switch SW1 has the ON seizure, the flow may proceed to step S41, and then, to step S42. In step S41, the idling stop control may be prohibited. In step S42, the regenerative power generation of the motor generator 16 may be prohibited. In other words, the occurrence of the ON seizure of the ON/OFF switch SW1 may provide difficulties in electrically separating the lithium ion battery 27 from the power circuits 41 and 42. Accordingly, a prohibition may be imposed on the idling stop control accompanied by the discharge of the lithium ion battery 27, and on the regenerative power generation control accompanied by the charge of the lithium ion battery 27.

In step S40, when the ON/OFF switch SW1 is determined otherwise than the ON seizure, the flow may proceed to step S43. In step S43, determination may be made on whether or not the ON/OFF switch SW1 has the OFF seizure. In step S43, when the ON/OFF switch SW1 has the OFF seizure, the flow may proceed to step S44, and then, to step S45. In step S44, the idling stop control may be prohibited. In step S45, the regenerative power generation of the motor generator 16 may be prohibited. In other words, the occurrence of the OFF seizure of the ON/OFF switch SW1 may provide difficulties in electrically coupling the lithium ion battery 27 to the power circuits 41 and 42. Accordingly, a prohibition may be imposed on the idling stop control accompanied by the discharge of the lithium ion battery 27, and on the regenerative power generation control accompanied by the charge of the lithium ion battery 27.

In step S43, when the ON/OFF switch is determined otherwise than the OFF seizure, the flow may proceed to step S46. In step S46, determination may be made on whether or not the ON/OFF switch SW2 has the ON seizure. In step S46, when the ON/OFF switch SW2 has the ON seizure, the flow may proceed to step S47. In step S47, the idling stop control may be prohibited. In other words, the occurrence of the ON seizure of the ON/OFF switch SW2 may provide difficulties in electrically separating the first power circuit 41 from the second power circuit 42. Accordingly, a prohibition may be imposed on the idling stop control that involves large power consumption in the engine restart, in view of prevention of an instantaneous voltage drop of the second power circuit 42 with respect to the instantaneous voltage drop protection load 33.

In step S46, when the ON/OFF switch SW2 is determined otherwise than the ON seizure, the flow may proceed to step S48. In step S48, determination may be made on whether or not the ON/OFF switch SW2 has the OFF seizure. In step S48, when the ON/OFF switch SW2 has the OFF seizure, the flow may proceed to step S49, and then, to step S50. In step S49, the idling stop control may be prohibited. In step S50, the ON/OFF switch SW1 may be controlled to the cut-off state. Furthermore, the flow may proceed to step S51, and then, to step S52. In step S51, the regenerative power generation of the motor generator 16 may be prohibited. In step S52, the combustion power generation of the motor generator 16 may be prohibited. In other words, the occurrence of the OFF seizure of the ON/OFF switch SW2 may provide difficulties in electrically coupling the first power circuit 41 to the second power circuit 42, and difficulties in utilizing the lithium ion battery 27 effectively. Accordingly, the ON/OFF switch SW1 may be opened to electrically separate the lithium ion battery 27, while a prohibition may be imposed on the idling stop control, the regenerative power generation, and the combustion power generation that are accompanied by the charge and discharge of the lithium ion battery 27.

The technology is by no means limited to the implementations described above, and may be modified in variety of ways without departing from the scope of the subject matter of the technology. In the forgoing description, the switch controller 53 may serve as the "failure determiner" and the "switch controller"; the charge and discharge controller 51 may serve as the "power generation controller"; and the ISS controller 52 may serve as the "engine controller". However, this is non-limiting. For example, another controller or other controllers may serve as the "failure determiner", the "switch controller", the "power generation controller", and the "engine controller". Moreover, one controller may constitute the "failure determiner", the "switch controller", the "power generation controller", and the "engine controller". Alternatively, a plurality of controllers may constitute the "failure determiner", the "switch controller", the "power generation controller", and the "engine controller".

In the forgoing description, a failure in both the ON/OFF switch SW1 and the ON/OFF switch SW2 may be determined. However, this is non-limiting. For example, a failure solely in the ON/OFF switch SW1 may be determined, or a failure solely in the ON/OFF switch SW2 may be determined. The ON/OFF switches SW1 and SW2 may be an electromagnetic switch that allows a contact to operate by an electromagnetic force, or a semiconductor switch that includes a semiconductor element. Note that, in the forgoing description, the ON/OFF switch SW2 may be inserted in the second power line 30 that constitutes the conduction path 100. However, this is non-limiting. The ON/OFF switch SW2 may be inserted in the conduction line 39 that constitutes the conduction path 101. With the ON/OFF switch SW2 thus inserted in the conduction path 101, it is also possible to control a coupling state of the lead battery 28 to the power circuits.

As described, the lithium ion battery 27 may be adopted as the "first power storage", and the lead battery 28 may be adopted as the "second power storage". However, this is non-limiting. Any power storage may be adopted as the "first power storage" and the "second power storage". For example, a lead battery, a nickel hydrogen battery, an electric double layered capacitor, and other batteries or capacitors may be adopted as the "first power storage". A lithium ion battery, a nickel hydrogen battery, an electric double layered capacitor, and other batteries or capacitors may be adopted as the "second power storage". Furthermore, a same kind of power storage may be adopted as the "first power storage" and the "second power storage". Note that, in combined use of the lithium ion battery 27 and the lead battery 28, an iron phosphate lithium ion battery may be adopted for the lithium ion battery 27. An iron phosphate lithium ion battery includes iron phosphate lithium as a positive electrode material.

In the forgoing description, in controlling the motor generator 16 to the combustion power generation state, the generated voltage VG may be raised to the predetermined voltage Va; in controlling the motor generator 16 to the regenerative power generation state, the generated voltage VG may be raised to the predetermined voltage Vb. However, this is non-limiting. For example, the target generated voltage of the motor generator 16 in the combustion power generation state may coincide with the target generated voltage of the motor generator 16 in the regenerative power generation state. Moreover, in the combustion power generation state and the regenerative power generation state, the target generated voltage of the motor generator 16 may vary based on a vehicle speed, the amount of operation of the accelerator pedal, and the amount of operation of the brake pedal. Furthermore, the forgoing description involves using the motor generator 16 that may serve as a generator and an electric motor. However, this is non-limiting. A generator that does not serve as an electric motor may be also used. Note that the motor generator 16 is not limited to an induction generator, and generators of other forms may also be adopted.

In the forgoing description, in the engine restart in the idling stop control, the motor generator 16 may be driven as an electric motor. However, this is non-limiting. For example, in acceleration traveling after the engine start, the motor generator 16 may be driven as an electric motor, allowing for reduction in a load on the engine 12. Furthermore, in the forgoing description, the vehicle body load 34 may be coupled to the first power circuit 41. However, this is non-limiting. The vehicle body load 34 may be coupled solely to the second power circuit 42, or may be coupled to both the first power circuit 41 and the second power circuit 42.

Although some preferred implementations of the technology have been described in the foregoing by way of example with reference to the accompanying drawings, the technology is by no means limited to the implementations described above. It should be appreciated that modifications and alterations may be made by persons skilled in the art without departing from the scope as defined by the appended claims. The technology is intended to include such modifications and alterations in so far as they fall within the scope of the appended claims or the equivalents thereof.

The invention claimed is:

1. A vehicle power source mounted on a vehicle, the vehicle power source comprising:
   a generator coupled to an engine and including an output terminal;
   a first power storage coupled to the generator and including a positive electrode terminal;
   a second power storage coupled, in parallel with the first storage, to the generator, and including a positive electrode terminal;
   a first switch switched based on a control signal, between a conductive state and a cut-off state, the conductive state involving coupling of the generator to the first power storage, and the cut-off state involving separation of the generator from the first power storage;

a second switch switched based on a control signal, between a conductive state and a cut-off state, the conductive state involving coupling of the generator to the second power storage, and the cut-off state involving separation of the generator from the second power storage;

a connection point that couples separate first, second, and third conduction paths to one another, the first conduction path being a path from the connection point to the positive electrode terminal of the first power storage, the second conduction path being a path from the connection point to the positive electrode terminal of the second power storage, and the third conduction path being a path from the connection point to the output terminal of the generator; and a failure determiner configured to determine one or more failures in the first switch and the second switch, each based on one or more of the control signal of the first switch, the control signal of the second switch, a current of the first conduction path, and a potential of the first conduction path, wherein the vehicle includes a start-up switch, and
the failure determiner determines the one or more failures when the start-up switch is operated to start-up stop side by an occupant.

2. The vehicle power source according to claim 1, further comprising a fourth conduction path, wherein the first power storage further includes a negative electrode terminal, and the fourth conduction path is coupled to the negative electrode terminal of the first power storage, the first switch is inserted in the first conduction path or the fourth conduction path, and the second switch is inserted in the second conduction path.

3. The vehicle power source according to claim 2, wherein the first switch is inserted in the first conduction path, and
the failure determiner configured to determine the one or more failures based on a potential at a point between the first switch and the connection point in the first conduction path.

4. The vehicle power source according to claim 2, wherein the control signal of the first switch includes a conduction signal and a cut-off signal, the conduction signal allowing the first switch to be switched to the conductive state, and the cut-off signal allowing the first switch to be switched to the cut-off state, the control signal of the second switch includes a conduction signal and a cut-off signal, the conduction signal allowing the second switch to be switched to the conductive state, and the cut-off signal allowing the second switch to be switched to the cut-off state, and the failure determiner executes:
first determination processing that involves determining a current and a potential of the first conduction path when the first switch is supplied with the conduction signal and the second switch is supplied with the conduction signal, second determination processing that involves determining the current and the potential of the first conduction path when the first switch is supplied with the cut-off signal and the second switch is supplied with the conduction signal, third determination processing that involves determining the current and the potential of the first conduction path when the first switch is supplied with the conduction signal and the second switch is supplied with the cut-off signal, and fourth determination processing that involves determining the current and the potential of the first conduction path when the first switch is supplied with the cut-off signal and the second switch is supplied with the cut-off signal.

5. The vehicle power source according to claim 2, wherein the failure determiner determines the one or more failures, when the start-up switch is operated to start-up side by an occupant and there is no record of execution of a determination of the one or more failures.

6. The vehicle power source according to claim 2, wherein the failure determiner determines the one or more failures, when the start-up switch is operated to start-up side by an occupant and there is record of a failure in one or both of the first switch and the second switch.

7. The vehicle power source according to claim 2, further comprising:
an engine controller that stops the engine based on a stop condition and restarts the engine based on a start condition; and
a power generation controller that controls the generator,
wherein when the first switch fails in the conductive state, the engine controller prohibits stop of the engine, and the power generation controller prohibits regenerative power generation of the generator.

8. The vehicle power source according to claim 2, further comprising:
an engine controller that stops the engine based on a stop condition and restarts the engine based on a start condition; and
a power generation controller that controls the generator,
wherein when the first switch fails in the cut-off state, the engine controller prohibits stop of the engine, and the power generation controller prohibits regenerative power generation of the generator.

9. The vehicle power source according to claim 2, further comprising an engine controller that stops the engine based on a stop condition and restarts the engine based on a start condition,
wherein when the second switch fails in the conductive state, the engine controller prohibits stop of the engine.

10. The vehicle power source according to claim 2, further comprising:
an engine controller that stops the engine based on a stop condition and restarts the engine based on a start condition;
a power generation controller that controls the generator; and
a switch controller that switches the first switch between the conductive state and the cut-off state,
wherein when the second switch fails in the cut-off state, the engine controller prohibits stop of the engine, the power generation controller prohibits regenerative power generation of the generator, and the switch controller switches the first switch to the cut-off state.

11. The vehicle power source according to claim 1, wherein
the first switch is inserted in the first conduction path, and
the failure determiner configured to determine the one or more failures, based on a potential at a point between the first switch and the connection point in the first conduction path.

12. The vehicle power source according to claim 1, wherein the control signal of the first switch includes a conduction signal and a cut-off signal, the conduction signal allowing the first switch to be switched to the conductive state, and the cut-off signal allowing the first switch to be switched to the cut-off state, the control signal of the second switch includes a conduction signal and a cut-off signal, the conduction signal allowing the second switch to be switched to the conductive state, and the cut-off signal allowing the second switch to be switched to the cut-off state, and the failure determiner executes:

first determination processing that involves determining a current and a potential of the first conduction path when the first switch is supplied with the conduction signal and the second switch is supplied with the conduction signal, second determination processing that involves determining the current and the potential of the first conduction path when the first switch is supplied with the cut-off signal and the second switch is supplied with the conduction signal, third determination processing that involves determining the current and the potential of the first conduction path when the first switch is supplied with the conduction signal and the second switch is supplied with the cut-off signal, and fourth determination processing that involves determining the current and the potential of the first conduction path when the first switch is supplied with the cut-off signal and the second switch is supplied with the cut-off signal.

13. The vehicle power source according to claim 1, wherein the failure determiner determines the one or more failures, when the start-up switch is operated to start-up side by an occupant and there is no record of execution of a determination of the one or more failures.

14. The vehicle power source according to claim 1, wherein the failure determiner determines the one or more failures, when the start-up switch is operated to start-up side by an occupant and there is record of a failure in one or both of the first switch and the second switch.

15. The vehicle power source according to claim 1, further comprising:

an engine controller that stops the engine based on a stop condition and restarts the engine based on a start condition; and a power generation controller that controls the generator, wherein when the first switch fails in the conductive state, the engine controller prohibits stop of the engine, and the power generation controller prohibits regenerative power generation of the generator.

16. The vehicle power source according to claim 1, further comprising:

an engine controller that stops the engine based on a stop condition and restarts the engine based on a start condition; and a power generation controller that controls the generator, wherein when the first switch fails in the cut-off state, the engine controller prohibits stop of the engine, and the power generation controller prohibits regenerative power generation of the generator.

17. The vehicle power source according to claim 1, further comprising an engine controller that stops the engine based on a stop condition and restarts the engine based on a start condition, wherein when the second switch fails in the conductive state, the engine controller prohibits stop of the engine.

18. The vehicle power source according to claim 1, further comprising:

an engine controller that stops the engine based on a stop condition and restarts the engine based on a start condition;

a power generation controller that controls the generator; and a switch controller that switches the first switch between the conductive state and the cut-off state, wherein when the second switch fails in the cut-off state, the engine controller prohibits stop of the engine, the power generation controller prohibits regenerative power generation of the generator, and the switch controller switches the first switch to the cut-off state.

* * * * *